United States Patent
Kakeda

(10) Patent No.: US 7,539,823 B2
(45) Date of Patent: May 26, 2009

(54) MULTIPROCESSING APPARATUS HAVING REDUCED CACHE MISS OCCURRENCES

(75) Inventor: Masahide Kakeda, Amagasaki (JP)

(73) Assignee: Panasonic Corporation, Osaka (JP)

( * ) Notice: Subject to any disclaimer, the term of this patent is extended or adjusted under 35 U.S.C. 154(b) by 322 days.

(21) Appl. No.: 11/223,932

(22) Filed: Sep. 13, 2005

(65) Prior Publication Data

US 2006/0059317 A1   Mar. 16, 2006

(30) Foreign Application Priority Data

Sep. 14, 2004   (JP) ............................. 2004-267472

(51) Int. Cl.
G06F 13/22 (2006.01)
(52) U.S. Cl. ...................... 711/141; 711/146
(58) Field of Classification Search ................. 711/141, 711/146
See application file for complete search history.

(56) References Cited

U.S. PATENT DOCUMENTS

| 2003/0033496 A1 | 2/2003 | Takagi et al. |
| 2004/0030835 A1 * | 2/2004 | van de Waerdt ............. 711/128 |
| 2005/0216684 A1 | 9/2005 | So et al. |

FOREIGN PATENT DOCUMENTS

| JP | 63-240649 | 10/1988 |
| JP | 5-197622 | 8/1993 |
| JP | 10-154100 | 6/1998 |

OTHER PUBLICATIONS

Hennesy et al., "Computer Architecture A Quantitative Approach Third Edition," Chapter 6 Multiprocessor and Thread level Parallelism Snooping protocols (p. 551).
English Language Abstract of JP 63-240649.
English Language Abstract of JP 5-197622.
English Language Abstract of JP 10-154100.

* cited by examiner

*Primary Examiner*—Reginald G Bragdon
*Assistant Examiner*—Kenneth M Lo
(74) *Attorney, Agent, or Firm*—Greenblum & Bernstein, P.L.C.

(57) ABSTRACT

A multiprocessing apparatus includes a cache control unit which monitors a local cache access signal, outputted from a processor, for notifying an occurrence of a cache miss, and notifies pseudo information to the processor via a shared bus controller, the pseudo information indicating that data corresponding to the local cache access signal is stored in a cache memory of a local cache that includes the cache control unit when the data corresponding to the local cache access signal is not actually stored in the cache memory.

16 Claims, 17 Drawing Sheets

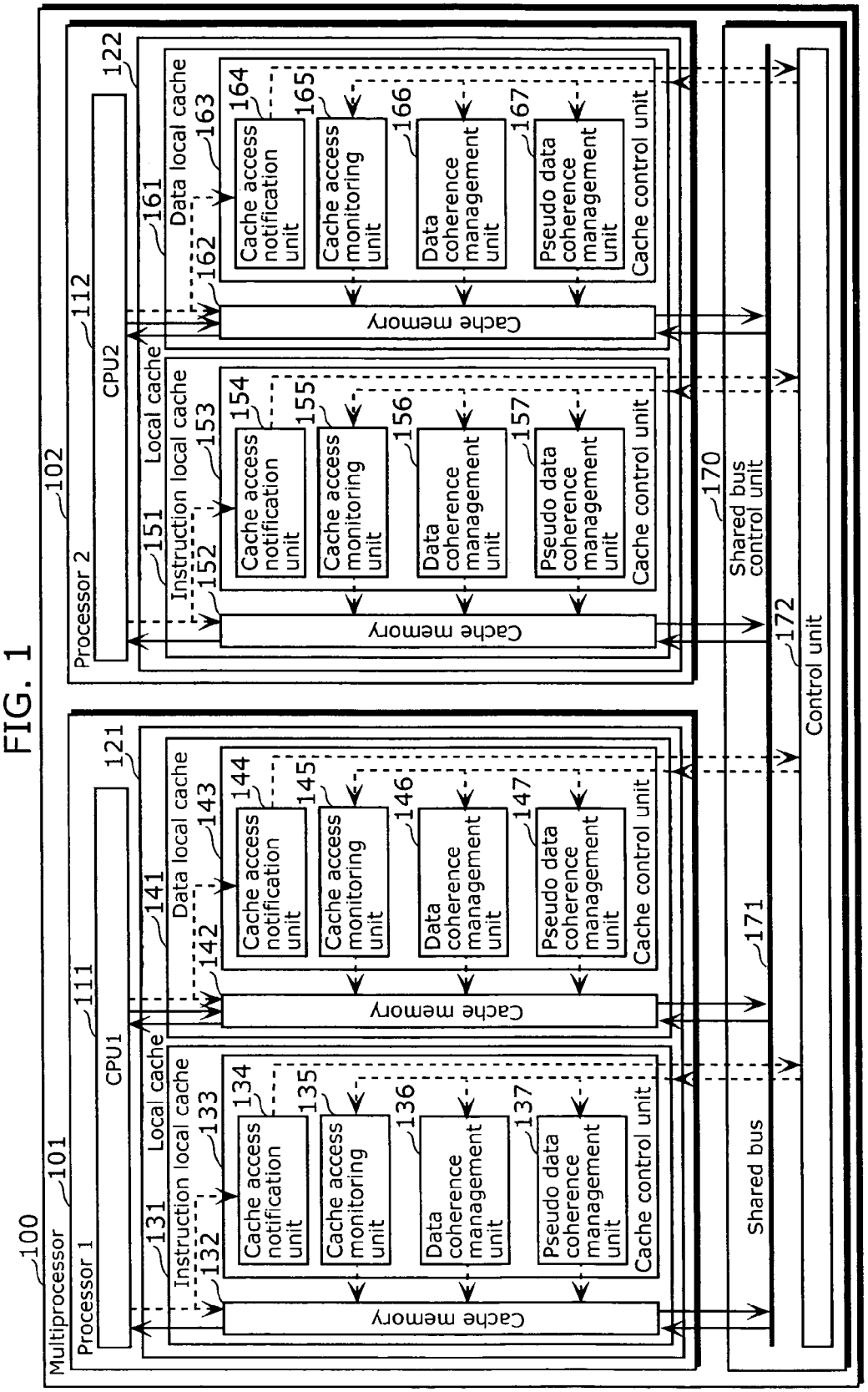

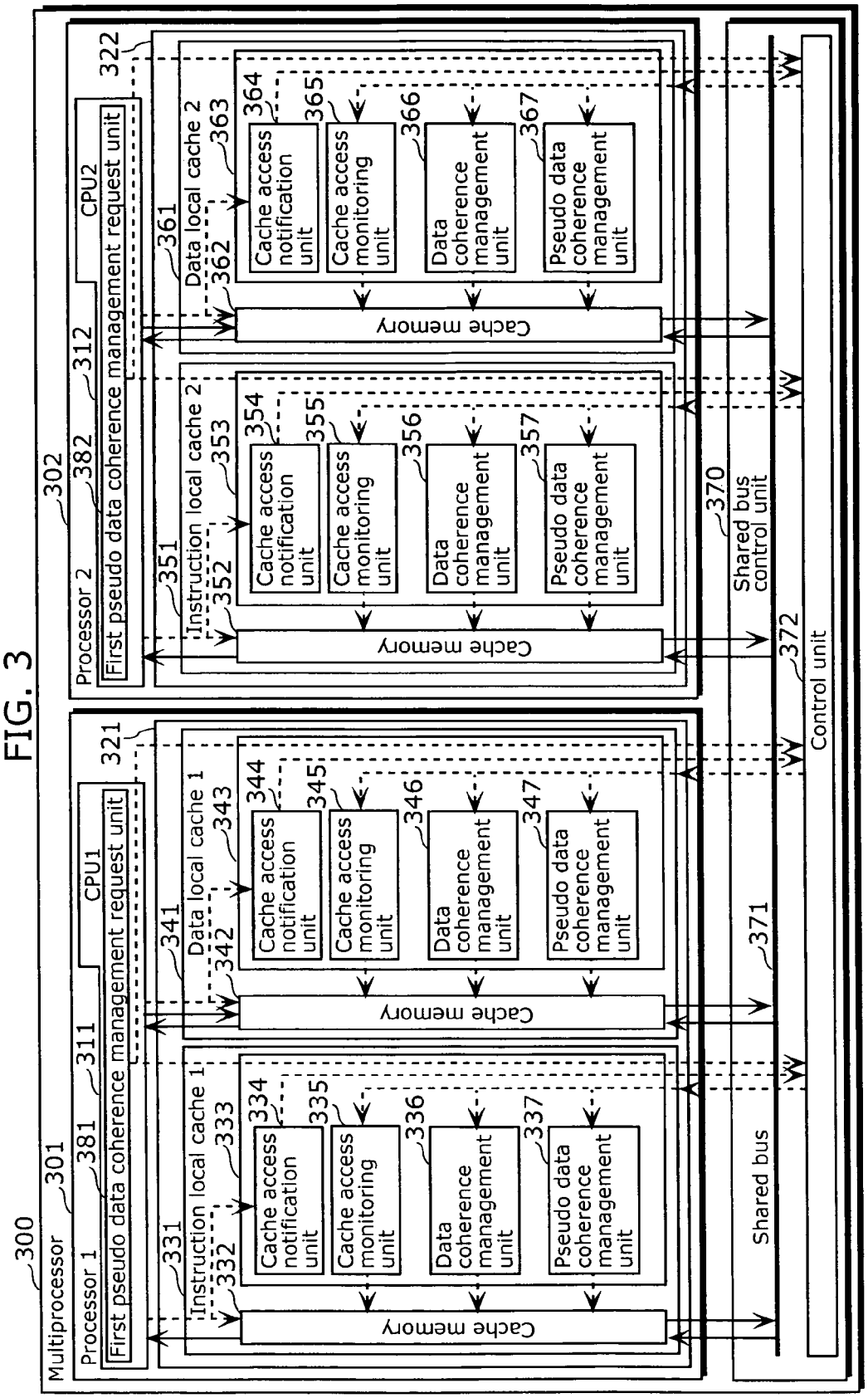

FIG. 15A

| Processor 1 | | | Processor 2 | | |
|---|---|---|---|---|---|
| mov | 0x40000000,a0 | ·····(1) | clr | d1 | ·····(6) |
| mov | (a0),d0 | ·····(2) | mov | 0x40000104,a0 | ·····(7) |
| add | 0x05,d0 | ·····(3) | mov | (a0),d0 | ·····(8) |
| mov | 0x40000100,a1 | ·····(4) | mov | 0x40000004,a1 | ·····(9) |
| mov | d0,(a1) | ·····(5) | mov | (a1),d1 | ·····(10) |
| | | | add | d1,d0 | ·····(11) |
| | | | mov | d0,(a0) | ·····(12) |

FIG. 15B

| Processor 1 | | | Processor 2 | | |
|---|---|---|---|---|---|
| mov | 0x40000000,a0 | ·····(1) | clr | d1 | ·····(6) |
| movc | (a0),d0 | ·····(2) | mov | 0x40000104,a0 | ·····(7) |
| add | 0x05,d0 | ·····(3) | movc | (a0),d0 | ·····(8) |
| mov | 0x40000100,a1 | ·····(4) | mov | 0x40000004,a1 | ·····(9) |
| mov | d0,(a1) | ·····(5) | mov | (a1),d1 | ·····(10) |
|  |  |  | add | d1,d0 | ·····(11) |
|  |  |  | mov | d0,(a0) | ·····(12) |

FIG. 15C

| Processor 1 | | |
|---|---|---|
| mov | 0x40000000,a0 | ·····(1) |
| mov | (a0),d0 | ·····(2) |
| add | 0x05,d0 | ·····(3) |
| mov | 0x80000100,a1 | ·····(4) |
| mov | d0,(a1) | ·····(5) |

| Processor 2 | | |
|---|---|---|
| clr | d1 | ·····(6) |
| mov | 0x40000104,a0 | ·····(7) |
| mov | (a0),d0 | ·····(8) |
| mov | 0x40000004,a1 | ·····(9) |
| mov | (a1),d1 | ·····(10) |
| add | d1,d0 | ·····(11) |
| mov | d0,(a0) | ·····(12) |

MULTIPROCESSING APPARATUS HAVING REDUCED CACHE MISS OCCURRENCES

BACKGROUND OF THE INVENTION (1) Field of the Invention

The present invention relates to a multiprocessing apparatus, and particularly to a technology that is effective when applied to the case where an arbitrary local cache is used out of those of plural processors in a semiconductor chip.

(2) Description of the Related Art

In a conventional symmetric multiprocessor, the respective local caches of processors are connected via a shared bus that is connected to a shared memory. According to a typical cache control method for such conventional symmetric multiprocessor, even when one CPU performs a cache refill to its local cache, another CPU performs no cache refill to its local cache. This is because each local cache performs a cache-to-cache data transfer only for the purpose of maintaining data coherence among the caches, and there is therefore a possibility that unnecessary data is stored into the cache in the case where a cache refill is performed by such another CPU. Despite this, under the management of a typical OS that supports multiprocessors, such as Linux, task scheduling is performed on the assumption that each task is executed on an arbitrary CPU. In other words, since even when one CPU performs a cache refill, another CPU performs no cache refill, and thus a cache miss occurs at a point on time when a task is assigned to such another CPU in task scheduling, although the same cache access would result in a cache hit in the case of the uniprocessor architecture.

The following should be referred to as documents disclosing technologies related to the present invention:

Japanese Laid-Open Patent Application No. S63-240649 (FIG. 1);

Japanese Laid-Open Patent Application No. H05-197622 (FIG. 1); and

John L. Hennessy & David A. Patterson "Computer Architecture A Quantitative Approach Third Edition" Chapter Six Multiprocessors and Thread-Level Parallelism Snooping Protocols [P.551].

However, a typical multiprocessor snoopy cache system is considered to be inferior to the uniprocessor cache system in terms of local characteristics. This is because, in terms of hardware control, while target data is stored into the local cache of a CPU when such CPU wishes to access the data, the same data is not stored into the local cache of another CPU. In contrast, in terms of software control (e.g. Linux), tasks are assigned to CPUs typically on a dynamic basis. In other words, there is a possibility that one task is executed by the number of times or more corresponding to the number of CPUs during a period from the beginning of the generation of a new task to its completion. Since there might occur, by the equivalent number of times, refill requests to the external memory as well as penalties attributable to inter-cache data sharing, it is estimated that the cache miss occurrence ratio of a multiprocessor attributable to cache locality is higher than that of a uniprocessor.

However, since the multiprocessor system adopts a method for reducing the number of cache miss penalties by causing the respective local caches to perform cache-to-cache data transfers and cache refills as much as possible even under the above circumstances, no serious problem occurs that is attributable to cache-to-cache data transfer in the case where the multiprocessor has two CPUs and where the number of penalty cycles in cache-to-cache data transfer is the same as the number of instruction execution cycles that is required at the time of local cache hit.

As is obvious from the above, it is required to improve cache locality in the multiprocessor architecture.

SUMMARY OF THE INVENTION

An object of the present invention is to provide a multiprocessing apparatus that is capable of reducing the cache miss occurrence ratio of the respective local caches, even in the case where there are plural CPUs referring to the same data, and reducing shared bus contentions attributable to cache-to-cache data transfer. This object is achieved by causing a second local cache monitoring the shared bus to perform, in parallel, (i) a notification of pseudo share (pseudo cache hit) information to a first local cache that has issued a cache refill request and (ii) reading of target data from the external memory to refill the cache memory of the second local cache, so that cache refill operations are performed simultaneously to two or more local caches.

Another object of the present invention is to provide a multiprocessing apparatus that is capable of reducing the cache miss occurrence ratio of the respective local caches, even in the case where there are plural CPUs referring to the same data, and preventing unnecessary cache-to-cache copy of data by determining whether to use pseudo share (pseudo cache hit) information depending on instruction. This object is achieved by causing a second local cache monitoring the shared bus to perform, in parallel, (i) a notification of pseudo share information to a first local cache that has issued a cache refill request and (ii) reading of target data from the external memory to refill the cache memory of the second local cache, and by determining whether to perform cache refill operations simultaneously to two or more local caches by use of the pseudo share information depending on the type of an instruction for performing an access to such first local cache.

Another object of the present invention is to provide a multiprocessing apparatus that is capable of reducing the cache miss occurrence ratio of the respective local caches, even in the case where there are plural CPUs referring to the same data, and preventing unnecessary cache-to-cache copy of data without having to add any instruction sets. This object is achieved by causing a second local cache monitoring the shared bus to perform, in parallel, (i) a notification of pseudo share (pseudo cache hit) information to a first local cache that has issued a cache refill request and (ii) reading of target data from the external memory to refill the cache memory of the second local cache, and by determining whether to perform cache refill operations simultaneously to two or more local caches by use of the pseudo share information depending on a mode signal from a register storing a processor status of the CPU that has accessed such first local cache.

Another object of the present invention is to provide a multiprocessing apparatus that is capable of reducing the cache miss occurrence ratio of the respective local caches, even in the case where there are plural CPUs referring to the same data, and preventing unnecessary cache-to-cache copy of data without having to add any instruction sets and without changing modes of the register storing a processor status. This object is achieved by causing a second local cache monitoring the shared bus to perform, in parallel, (i) a notification of pseudo share (pseudo cache hit) information to a first local cache that has issued a cache refill request and (ii) reading of target data from the external memory to refill the cache memory of the second local cache, and by determining whether to perform cache refill operations simultaneously to two or more local caches by use of the pseudo share information depending on an access address space to be accessed by such first local cache at the time of executing a load/store instruction.

Another object of the present invention is to provide a multiprocessing apparatus that is capable of reducing the cache miss occurrence ratio of the respective local caches, even in the case where there are plural CPUs referring to the same data, and preventing unnecessary cache-to-cache copy of data by controlling the pseudo share (pseudo cache hit) information on a page-by-page and a process-by-process basis. This object is achieved by causing a second local cache monitoring the shared bus to perform, in parallel, (i) a notification of pseudo share information to a first local cache that has issued a cache refill request and (ii) reading of target data from the external memory to refill the cache memory of the second local cache, and by determining whether to perform cache refill operations simultaneously to two or more local caches by use of the pseudo share information depending on a first pseudo data coherence management request flag stored in a TLB that converts a logical address space into a physical address space.

Another object of the present invention is to provide a multiprocessing apparatus that is capable of reducing the cache miss occurrence ratio of the respective local caches, even in the case where there are plural CPUs referring to the same data, and preventing unnecessary cache-to-cache copy of data by allowing even a CPU having no TLB to control the pseudo share (pseudo cache hit) information. This object is achieved by causing a second local cache monitoring the shared bus to perform, in parallel, (i) a notification of pseudo share information to a first local cache that has issued a cache refill request and (ii) reading of target data from the external memory to refill the cache memory of the second local cache, and by determining whether to perform cache refill operations simultaneously to two or more local caches by use of the pseudo share information depending on whether or not two logical products match or not, one being that of an address for the second local cache and an address mask stored by the first or second pseudo data coherence management request address mask storage unit, and the other being that of an address stored by the first or second pseudo data coherence management request address mask storage unit and said address mask.

Further another object of the present invention is to provide a multiprocessing apparatus that is capable of selectively storing only high priority data into a first local cache without storing copies of data in the respective local caches even in the case where there are plural CPUs referring to the same data. This object is achieved by causing a second local cache monitoring the shared bus to perform, in parallel, (i) a notification of pseudo share (pseudo cache hit) information to the first local cache that has issued a cache refill request and (ii) reading of target data from the external memory to refill the cache memory of the second local cache, and by causing a cache refill operation to be performed only to the second local cache without caching the data in the first local cache so that the target data is directly transferred to the CPU.

Further another object of the present invention is to provide a multiprocessing apparatus that is capable of selectively storing only high priority data into a first local cache without storing copies of data in the respective local caches, even in the case where there are plural CPUs referring to the same data, and improving reference locality of data accesses dealing with a large amount of data by dynamically changing the pseudo number of times, stored in a second local cache, for which data refills are performed. This object is achieved by causing the second local cache monitoring the shared bus to perform, in parallel, (i) a notification of pseudo share (pseudo cache hit) information to the first local cache that has issued a cache refill request and (ii) reading of target data from the external memory to refill the cache memory of the second local cache, and by causing the second local cache to perform cache refill operations by the number of times determined by the second cache refill number storage unit without caching the data in the first local cache so that the target data is directly transferred to the CPU.

Further another object of the present invention is to provide a multiprocessing apparatus (i) that is capable of selectively storing only high priority data into a first local cache without storing copies of data in the respective local caches, even in the case where there are plural CPUs referring to the same data, (ii) that is capable of dynamically changing the number of times, stored in a second local cache, for which data refills are performed, and (iii) that does not require purge management even in the case where the first local cache is a cache memory that does not manage dirty bits. This object is achieved by: causing the second local cache monitoring the shared bus to perform, in parallel, (i) a notification of pseudo share (pseudo cache hit) information to the first local cache that has issued a cache refill request and (ii) reading of target data from the external memory to refill the cache memory of the second local cache; causing only the second local cache to perform cache refill operations by the number of times determined by the second cache refill number storage unit without caching the data in the first local cache so that the target data is directly transferred to the CPU; and determining whether to invalidate or update the data stored in the second local cache, in the case where there is a write access from the CPU connected to such first local cache, and issuing a write request to the external memory to write the updated data.

In order to achieve the above problem, the multiprocessing apparatus according to the present invention is a multiprocessing apparatus including a plurality of processors, a shared bus, and a shared bus controller, wherein each of the processors includes a central processing unit (CPU) and a local cache, each of the local caches includes a cache memory, and a cache control unit that controls the cache memory, each of the cache control units includes a data coherence management unit that manages data coherence between the local caches by controlling data transfer carried out, via the shared bus, between the local caches, wherein at least one of the cache control units (a) monitors a local cache access signal, outputted from another one of the processors, for notifying an occurrence of a cache miss, and (b) notifies pseudo information to the another one of the processors via the shared bus controller, the pseudo information indicating that data corresponding to the local cache access signal is stored in the cache memory of the local cache that includes the at least one of the cache control units, even in the case where the data corresponding to the local cache access signal is not actually stored.

Here, the at least one of the cache control units may issue a memory read request to a main memory via the shared bus controller, the memory read request being issued to read, from the main memory, data corresponding to the local cache access signal.

With this structure, by notifying the pseudo information, which is pseudo share (pseudo cache hit) information, it becomes possible to flexibly control data coherence such as by performing cache refills simultaneously to two or more local caches and by causing a local cache, other than the one which has occurred a cache miss, to perform cache refill.

Here, the at least one of the cache control units and the cache control unit of the another one of the processors may store, into the respective cache memories, the data that has been read out, via the shared bus, in response to the memory read request.

With this structure, even in the case where there are plural CPUs referring to the same data, it becomes possible to reduce the cache miss occurrence ratio of the respective local caches, and to reduce shared bus contentions attributable to cache-to-cache data transfer.

Here, the at least one of the cache control units may store the data, read out in response to the memory read request via the shared bus, into the cache memory of the local cache that includes the at least one of the cache control units, and the cache control unit of the another one of the processors may output the data, read out in response to the memory read request via the shared bus, to the CPU included in the another one of the processors, without storing the data into the cache memory of the another one of the processors.

With this structure, it becomes possible to prevent the reduction in substantial cache capacity attributable to different cache memories making unnecessary share of the same data.

Furthermore, the multiprocessing apparatus according to the present invention may include: a shared bus for maintaining data coherence between caches of respective processors; a shared bus controller that controls such shared bus; a cache access notification unit that notifies the shred bus of details of an access made by a first local cache; a cache access monitoring unit that monitors a second local cache based on access information obtained by the cache access notification unit; a data coherence management unit that controls the second local cache and performs the related data transfer based on a result of the search performed by the second local cache monitoring unit; and the pseudo data coherence management unit that controls the second local cache and the related data transfer regardless of the result of the search performed by the second local cache monitoring unit. This structure makes it possible for the multiprocessing apparatus according to the present invention to reduce, in the case where there are plural CPUs referring to the same data in the multiprocessing architecture, the cache miss occurrence ratio of their respective local caches, and to reduce shared bus contentions attributable to cache-to-cache data transfer.

In the multiprocessor architecture, since programs are executed on the respective CPUs, there is a decrease in the reference locality of the local caches. Thus, the prevention of decrease in the cache hit ratio attributable to the above-described decrease in reference locality is achieved by performing a refill operation simultaneously to another local cache at the time of cache refill, as a solution to the problem of the occurrence of shared bus contentions and an increased number of cache miss penalties caused by the decrease in the cache hit ratio in each local cache and caused by an increased number of cache-to-cache data transfer to be performed even in the case where target data is stored in another local cache.

Here, in addition to the above, the multiprocessing apparatus may include a unit that causes cache refills to be performed collectively to the local caches, only for memory access, in the case where the operation of the pseudo data coherence management unit is enabled based on the first pseudo data coherence management request signal that is generated by the first pseudo data coherence management request instruction detection unit based on a result of decoding an instruction executed by the CPU.

With this structure, by limiting cache refill operations depending on instruction, without always causing another local cache to perform a cache refill operation, it becomes possible to (i) prevent the decrease in the cache hit ratio attributable to the above-described decrease in the reference locality, and (ii) reduce the decrease in effective cache capacity attributable to unnecessary cache refill operations.

Here, in addition to the above, the multiprocessing apparatus may include a unit that causes cache refills to be performed collectively to the local caches, without adding or changing any instruction sets, in the case where the operation of the pseudo data coherence management unit is enabled based on the first pseudo data coherence management request signal that is generated by the first pseudo data coherence management request mode detection unit depending on a mode signal managed by the processor status storage unit at the time of instruction execution by the CPU.

With this structure, by limiting cache refill operations depending on a mode signal managed by the processor status storage unit, it becomes possible, without adding or changing any instruction sets, to (i) prevent the decrease in the cache hit ratio attributable to the above-described decrease in the reference locality, and (ii) reduce the decrease in effective cache capacity attributable to unnecessary cache refill operations.

Here, in addition to the above, the multiprocessing apparatus may include a unit that causes cache refills to be performed collectively to the local caches, without adding or changing any instruction sets and without changing processor modes, in the case where the operation of the pseudo data coherence management unit is enabled based on the first pseudo data coherence management request signal that is generated by the first pseudo data coherence management request space judgment unit depending on a logical address space accessed by the CPU.

With this structure, by being able to set addresses to be accessed by use of a mask register that masks addresses to be accessed and an access register that compares addresses to be accessed, it becomes possible to (i) provide a more segmented space of addresses to be accessed and thus to improve program simplicity, (ii) prevent the decrease in the cache hit ratio attributable to the above-described decrease in the reference locality, and (iii) reduce the decrease in effective cache capacity attributable to unnecessary cache refill operations.

Here, in addition to the above, the multiprocessing apparatus may include a unit that causes cache refills to be performed collectively to the local caches for each page and each logical address of a logical address space accessed by the CPU, without adding any instruction sets, in the case where the operation of the pseudo data coherence management unit is enabled based on the first pseudo data coherence management request signal that is generated by the first pseudo data coherence management request address conversion unit being a TLB for converting a logical address space into a physical address space.

With this structure, by being able to set addresses to be accessed based on a flag signal set in the TLB, it becomes possible to (i) provide a more segmented space of addresses to be accessed and thus to improve program simplicity, (ii) prevent the decrease in the cache hit ratio attributable to the above-described decrease in the reference locality, and (iii) reduce the decrease in effective cache capacity attributable to unnecessary cache refill operations.

Here, in addition to the above, the multiprocessing apparatus may include a unit that controls whether to perform cache refills collectively to the respective local caches according to an arbitrary address of logical addresses accessed by the CPU, without adding any instruction sets and without requiring a processor to have a memory management unit (MMU), in the case where the operation of the pseudo data coherence management unit is enabled based on the first pseudo data coherence management request signal that is generated by use of an address for the first local cache, the first pseudo data coherence management request address storage unit, and the first pseudo data coherence management request address mask storage unit.

Here, the multiprocessing apparatus may include a pseudo data coherence management share judgment unit that causes target data predicted to be shared by the respective processors to be collectively refilled to the respective local caches based on an access request from the CPU to which the first local cache belongs by judging that the first local cache should store, into the cache memory of such first local cache, the target data obtained by the second local cache, in the case where a cache refill operation has been performed based on a judgment made by the pseudo data coherence management unit.

Here, the multiprocessing apparatus may include a pseudo data coherence management share judgment unit that is capable of storing target data into the second local cache storing data with low priority without changing the data stored in the first local cache based on an access request from the CPU to which the first local cache belongs by causing the first local cache not to store, into the cache memory of such first local cache, the target data obtained by the second local cache, in the case where a cache refill operation has been performed based on a judgment made by the pseudo data coherence management unit.

Here, the multiprocessing apparatus may judge, based on a judgment made by the pseudo data coherence management share judgment unit, about whether or not to cause the first local cache to store, into the cache memory of such first local cache, the target data obtained by the second local cache, in the case where a cache refill operation has been performed based on a judgment made by the pseudo data coherence management unit.

Here, the multiprocessing apparatus may include a pseudo data coherence management request number storage unit that facilitates the control of refill operations, the pseudo data coherence management request number storage unit being characterized in that it causes the pseudo data coherence management unit to issue, to the first local cache and second local cache, refill requests by the number that is the same as the number of times issued by the data coherence management unit, in the case where a cache refill operation has been performed based on a judgment made by the pseudo data coherence management unit.

Here, the multiprocessing apparatus may include a pseudo data coherence management request number storage unit that is suitable for cache refill operations dealing with a large amount of data such as graphics processing, the pseudo data coherence management request number storage unit being characterized in that it causes the pseudo data coherence management unit to issue, to the first local cache and second local cache, refill requests by the number that is different from the number of times issued by the data coherence management unit, in the case where a cache refill operation has been performed based on a judgment made by the pseudo data coherence management unit.

Here, the multiprocessing apparatus may include a pseudo data coherence management request number storage unit that is characterized in that it causes the pseudo data coherence management unit to issue, to the first local cache and second local cache, refill requests by dynamically switching refill requests different from the number of refill requests issued by the data coherence management unit, in the case where a cache refill operation has been performed based on a judgment made by the pseudo data coherence management unit.

Here, the multiprocessing apparatus may include a second data coherence management unit that is characterized in that it enables a cache memory having no dirty bit to cache data by updating the cache memory of such second local cache and by issuing a write request to the external memory simultaneously, in the case where the CPU performs a write operation to the first local cache after a refill operation is performed to the second local cache whose cache memory has no dirty bit, based on a judgment made by the pseudo data coherence management unit.

Here, the multiprocessing apparatus may include a second data coherence management unit that is characterized in that it enables a cache memory having no dirty bit to cache data by invalidating data stored in the cache memory of such second local cache and by issuing a write request to the external memory simultaneously, in the case where the CPU performs a write operation to the first local cache after a refill operation is performed to the second local cache whose cache memory has no dirty bit, based on a judgment made by the pseudo data coherence management unit.

Here, the multiprocessing apparatus may include a second data coherence management unit that is characterized in that it enables a cache memory having no dirty bit to cache data, by determining, by use of the data coherence management write mode storage unit, whether to invalidate or update data stored in the cache memory of such second local cache and by issuing a write request to the external memory simultaneously, in the case where the CPU performs a write operation to the first local cache after a refill operation is performed to the second local cache whose cache memory has no dirty bit, based on a judgment made by the pseudo data coherence management unit.

Since programs are executed on the respective CPUs in the multiprocessor architecture, there is a decrease in the reference locality of the local caches. In view of this, the effect produced by the present invention is that it is possible to prevent the decrease in the cache hit ratio attributable to the above-described decrease in reference locality by causing a refill operation to be performed simultaneously to another local cache at the time of cache refill. This effect provides a solution to the problem of the occurrence of shared bus contentions and an increased number of cache miss penalties caused by the decrease in the cache hit ratio in each local cache and by an increased number of cache-to-cache data transfer to be performed even in the case where target data is stored in another local cache.

With the aim of preventing unnecessary cache refill operations from being performed, the present invention produces the effect of being able to (i) prevent the decrease in the cache hit ratio attributable to the above-described decrease in the reference locality, and (ii) reduce the decrease in effective cache capacity attributable to unnecessary cache refill operations, by limiting cache refill operations depending on instruction, without always causing another local cache to perform a cache refill operation.

With the aim of eliminating the necessity to change instruction sets, the present invention produces the effect of being able to (i) prevent the decrease in the cache hit ratio attributable to the above-described decrease in the reference locality, and (ii) reduce the decrease in effective cache capacity attributable to unnecessary cache refill operations, by limiting cache refill operations depending on a mode signal managed by the processor status storage unit, without adding or changing any instruction sets.

With the aim of alleviating the reduction in the efficiency of instruction execution attributable to the switching of mode settings, the present invention produces the effect of being able to (i) prevent the decrease in the cache hit ratio attributable to the above-described decrease in the reference locality, and (ii) reduce the decrease in effective cache capacity attributable to unnecessary cache refill operations, by limiting cache refill operations depending on an address space to be accessed, without changing mode settings.

With the aim of preventing an increase in program complexity that is caused by the roughness in mode switching, the present invention produces the effect of being able to (i) provide a more segmented space of addresses to be accessed and thus to improve program simplicity, (ii) prevent the decrease in the cache hit ratio attributable to the above-described decrease in the reference locality, and (iii) reduce the decrease in effective cache capacity attributable to unnecessary cache refill operations, by setting addresses to be accessed by use of a mask register that masks addresses to be accessed and an access register that compares addresses to be accessed.

With the aim of preventing an increase in program complexity that is caused by the roughness in mode switching, the present invention produces the effect of being able to (i) provide a more segmented space of addresses to be accessed and thus to improve program simplicity, (ii) prevent the decrease in the cache hit ratio attributable to the above-described decrease in the reference locality, and (iii) reduce the decrease in effective cache capacity attributable to unnecessary cache refill operations, by setting addresses to be accessed based on a flag signal set in the TLB.

With the aim of preventing the decrease in the substantial capacity of the entire local caches in the multiprocessing apparatus attributable to data copying carried out between the local caches, the present invention produces the effect of being able to increase the substantial capacity of the local caches by deleting data which would have been shared conventionally by causing such data to be stored only into the other local cache, as well as being able to allowing data for which real time processing is highly required to remain in the own cache memory by controlling data rewrite of the cache memory of the own local cache.

Another effect of the present invention is, in the case where a large amount of data is wished to be refilled to a cache such as data for graphic processing, to be able to improve the reference locality of the caches without changing the size of data to be refilled, by launching a cache refill operation according to pseudo share information and by changing the number of times cache refill operations are to be performed in cache operations originally having nothing to do with refill operations.

Another effect of the present invention is, in the case where data refilled to another local cache is to be refilled to a cache memory having no dirty bit, to be able to allow data write to such cache memory having no dirty bit and to maintain data coherence with the external memory.

The disclosure of Japanese Patent Application No. 2004-267472 filed on Sep. 14, 2004 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 1 is a functional block diagram showing an architecture of a multiprocessor according to the present invention;

FIG. 3 is a functional block diagram showing another architecture of the multiprocessor according to the present invention;

FIG. 15A is a diagram showing a program 1 for describing operations of the multiprocessor;

FIG. 15B is a diagram showing a program 2 for describing operations of the multiprocessor; and FIG. 15C is a diagram showing a program 3 for describing operations of the multiprocessor.

DESCRIPTION OF THE PREFERRED EMBODIMENTS

Figure 2A:
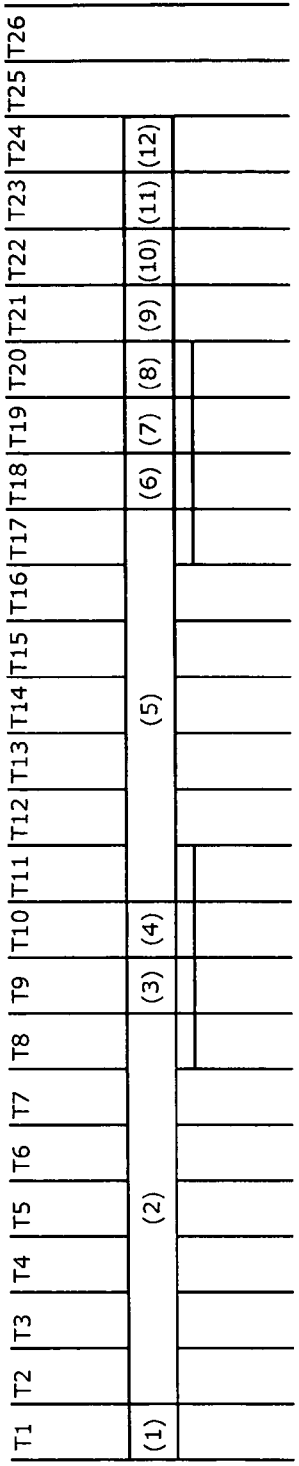
FIGS. 2A to 2C are diagrams for describing program execution time.

The following describes the preferred embodiments of the present invention with reference to the drawings.

First Embodiment

Referring to FIG. 1, FIGS. 2A to 2C, FIG. 13, and FIG. 15A, a preferred embodiment of the multiprocessor is described.

FIG. 1 is a functional block diagram showing the multiprocessor according to the present embodiment. FIG. 1 depicts a multiprocessor 100 in which two processors are connected to a shared bus control unit that is made up of a shared bus and a control unit thereof. Processors 101 and 102 include CPUs 111 and 112 as well as local caches 121 and 122, respectively. The local caches 121 and 122 include instruction local caches 131 and 151 as well as data local caches 141 and 161, respectively. The instruction local caches 131 and 151 as well as the data local caches 141 and 161 include cache memories 132, 142, 152, and 162 as well as cache control units 133, 143, 153, and 163 thereof, respectively. The cache control units 133, 143, 153, and 163 include the following units, respectively: data coherence management units 136, 146, 156, and 166 that (i) manage transfer of data between an external memory and the respective CPUs 111 and 112 as well as coherence of such data and (ii) manage cache-to-cache transfer of data as well as coherence of such data; cache access notification units 134, 144, 154, and 164, each of which notifies, to the other local caches, the details of an access performed by the own local cache; cache access monitoring unit 135, 145, 155, and 165, each of which monitors the details of an access performed by another local cache; and pseudo data coherence management units 137, 147, 157, and 167, each of which launches an operation to read data from the external memory to refill the own local cache by operating as if such local cache already stored the target data in its cache memory in the case where another local cache has accessed such target data.

The instruction local caches 131 and 151 are connected to the respective CPUs 111 and 121 as well as to the shared bus control unit 170. To interconnect the CPUs 111 and 121 and the respective instruction local caches 131 and 151, there are CPU fetch address buses for transferring fetch addresses from the respective CPUs 111 and 112, as well as CPU fetch data buses for transferring instructions corresponding to the fetch addresses from the respective CPUs 111 and 112. Furthermore, to interconnect the instruction local caches 131 and 151 and the shared bus control unit 170, respectively, there are instruction local cache fetch address buses for transferring fetch addresses from the respective instruction local caches 131 and 151 as well as instruction local cache fetch data buses for transferring instructions corresponding to the fetch addresses from the respective instruction local caches 131 and 151 and for transferring shared data from the other instruction local cache 131 or 151. For use with data transfer with the other instruction local cache, an instruction local cache shared address bus for transferring the details of an access of the other instruction local cache is connected between the instruction local caches, and an instruction local cache shared data bus for transferring data from the instruction local caches to the shared bus control unit is connected between two instruction local caches and the shared bus control unit.

The data local caches 141 and 161 are connected to the respective CPUs 111 and 112 as well as to the shared bus control unit 170. To interconnect the CPUs 111 and 112 and the respective data local caches 141 and 161, there are (i) CPU data address buses for transferring write/read addresses from the respective CPUs 111 and 112, (ii) CPU data read data buses for transferring data corresponding to read addresses from the respective CPUs 111 and 112, and (iii) CPU data write data buses for transferring data corresponding to write addresses from the respective CPUs 111 and 112. Furthermore, to interconnect the data local caches 141 and 161 and the shared bus control unit 170, respectively, there are data local cache address buses for transferring data read addresses and data write addresses from the respective data local caches 141 and 161 as well as data local cache read data buses for transferring data corresponding to the read addresses from the respective data local caches 141 and 161 and transferring shared data from the other data local cache. For use with data transfer with the other data local cache, a data local cache shared address bus for transferring the details of an access of the other data local cache is connected between the two data local caches, and a data local cache shared data bus for transferring data from the data local caches 141 and 161 to the shared bus control unit and to the external memory is connected between the two data local caches and the shared bus control unit.

In the first embodiment, although the data buses connected to the shared bus control unit 170 are used for both access to the external memory and access between the caches, the present invention is not limited to this structure, and therefore it is also possible to have individual buses for access to the external memory and access between the caches in order to minimize the occurrence of bus contentions.

When a memory access from the CPUs 111 and 112 to the respective instruction local caches 131 and 151 and to the respective data local caches 141 and 161 is any of the following, the cache access notification units 134, 144, 154, and 164 output, to the shared bus control unit 170, an access address signal indicating details of such memory access: a read access using no cache (non-cacheable read access); a write access using no cache (non-cacheable write access); a write access using a cache (cacheable write access); and a cache miss of a read access using a cache (a cache miss of a cacheable read access). From such notification signal, it is possible for the other local caches to know whether or not processing to maintain data coherence is necessary.

The cache access monitoring units 135, 145, 155, and 165 search the cache memories of their respective local caches in response to a notification from the cache access notification unit 134, 144, 154, or 164 to the shared bus control unit 170 indicating a non-cacheable read access and a cache miss of a cacheable read access. At this time, the data coherence management units 136, 146, 156, and 166 control their respective local caches so that they output, to the shared bus control unit 170, target data in the case where their respective local caches store the access target data of another local cache whose cache access notification unit 134, 144, 154, or 164 has made the above notification of the access address signal.

The cache access monitoring units 135, 145, 155, and 165 search the cache memories of their respective local caches in response to a notification from the cache access notification unit 134, 144, 154, or 164 to the shared bus control unit 170 indicating a cache hit of a cacheable write access. At this time, the data coherence management units 136, 146, 156, and 166 control their respective local caches so that they update data stored therein with the target data outputted to the shared bus control unit 170, or so that they invalidate the data stored therein in the case where their respective local caches store data that is different from the target data whose access address has been notified by the cache access notification unit 134, 144, 154, or 164 of another local cache.

The cache access monitoring units 135, 145, 155, and 165 search the cache memories of their respective local caches in response to a notification from the cache access notification unit 134, 144, 154, or 164 to the shared bus control unit 170 indicating a cache miss of a cacheable write access. At this time, the data coherence management units 136, 146, 156, and 166 control their respective local caches so that they update data stored therein with the target data outputted to the shared bus control unit 170 and output the updated data to the shared bus control unit 170, or so that they invalidate data stored therein in the case where their respective local caches store data that is different from the target data whose access address has been notified by the cache access notification unit 134, 144, 154, or 164 of another local cache.

The cache access monitoring units 135, 145, 155, and 165 search the cache memories of their respective local caches in response to a notification from the cache access notification unit 134, 144, 154, or 164 to the shared bus control unit 170 indicating a non-cacheable write access. The data coherence management units 136, 146, 156, and 166 control their respective local caches so that they update data stored therein with the target data outputted to the shared bus control unit 170, or so that they invalidate data stored therein in the case where their respective local caches store data that is different from the target data whose access address has been notified by the cache access notification unit 134, 144, 154, or 164 of another local cache.

The pseudo data coherence management units 137, 147, 157, and 167 launch an operation to read data from the external memory to refill the own local cache by operating under the disguise that their respective local caches already store the target data in the respective cache memories 132, 142, 152, and 162, in the case where the cache access notification unit of another local cache notifies the shared bus control unit 170 of a cache miss of a cacheable read access and a cache miss of a cacheable write access.

The functional block of the multiprocessor shown in FIG. 1 is as described above.

Figure 13:
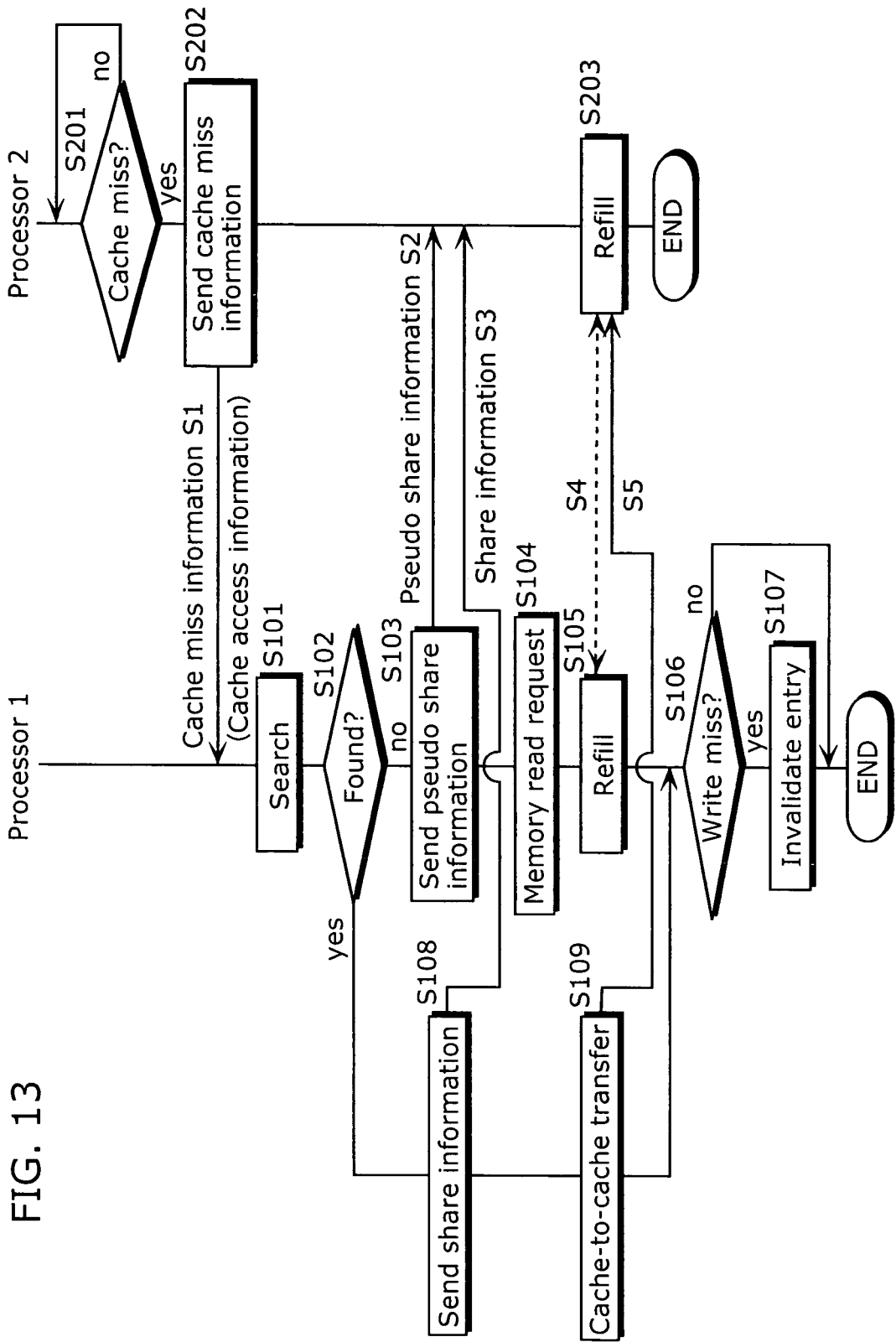
FIG. 13 is a flowchart showing operations performed by the respective local caches and the shared bus control unit when a cache miss has occurred.

FIG. 13 is a flowchart showing operations performed by the respective local caches and the shared bus control unit when a cache miss has occurred. This flowchart describes an operation for achieving data coherence in the case where a cache miss occurs in the data local cache 122 in the processor 102.

As shown in this flowchart, in the case where a cache miss has occurred in the data local cache 122 in the processor 102 (S201: yes), the cache access notification unit 164 of the processor 102 sends, to the shared bus control unit 170, the fact that a cache miss of a cacheable write access has occurred, as cache miss information S1 (S202). Such cache miss information S1 includes a memory access address and cache access information such as a distinction between read and write.

Upon receipt of the cache miss information S1 via the shared bus control unit 170, the cache access monitoring unit 145 of the processor 101 searches the cache memory 142 for an entry of the data corresponding to the memory access address included in the cache miss information S1 (S101). When the result of the search is that there is no entry of the data, i.e., it is a snoopy cache miss access (S102: no), the pseudo data coherence management unit 146 of the processor 101 sends pseudo share information S2 to the processor 102 (S103). The pseudo share information S2 is pseudo information indicating that there is a snoopy cache hit despite that it is actually a snoopy cache miss.

Furthermore, the pseudo data coherence management unit 146 of the processor 101 issues, to the shared bus control unit 170, an external memory read request for performing a cache refill access (S104). In response to this, the shared bus control unit 170 reads, from the external memory, the data corresponding to the snoopy cache miss onto the shared bus 171. Then, the processor 101 whose pseudo data coherence management unit 146 has issued the external memory read request refills its cache memory with the data S4 read onto the shared bus 171 (S105), and simultaneously, the processor 102 which has received the pseudo share information S2 refills its cache memory with the data read onto the shared bus 171 (S203). As described above, the data S4 read out from the external memory is refilled to the respective local caches simultaneously.

After the refill completes, if the cache miss information S1 indicates a cache miss of a write access (S106), the processor 101 invalidates the refilled entry (S107).

Meanwhile, when the result of the search in S102 is that there is an entry of the data, i.e., it is a snoopy cache hit access (S102: yes), the processor 101 sends share information S3 to the processor 102 (S103). The share information S3 is information indicating that there is a snoopy cache hit, and may have the same contents as that of the above-described pseudo share information S2. Furthermore, the processor 101 performs a cache-to-cache data transfer to the processor 102 (S109), as a result of which the processor 102 refills the transferred data S5 to its local cache (S203). After the completion of the data transfer to the processor 102, if the cache miss information S1 indicates a cache miss of a write access (S106), the processor 101 invalidates the above entry (S107).

As described above, as in the case of receiving the share information S3, the processor 102 which has received the pseudo share information S2 performs an operation to refill data from the shared bus 171. In this case, the processor 102 is not required to make a distinction between whether the data transferred onto the shared bus 171 is the data S4 read out from the external memory or the data S5 transferred from the processor 101.

Note that FIG. 13 illustrates the case where a cache miss has occurred in the processor 102, but in the case where a cache miss occurred in the processor 101, the operations of the processors 101 and 102 in the flowchart are transposed and performed accordingly.

FIG. 15A is a diagram showing a program 1 according to the first embodiment. In FIG. 15A, instructions executed by the processor 101 and instructions executed by the processor 102 are illustrated side by side.

Figure 2B:
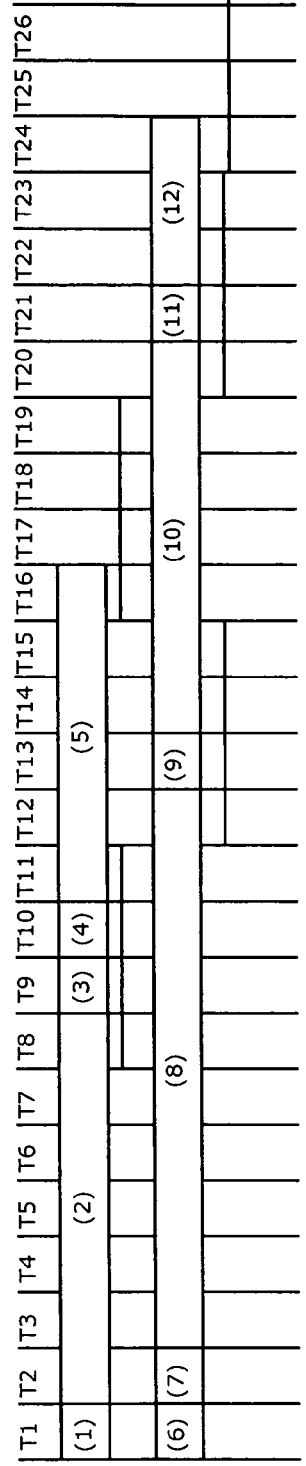
Figure 2C:
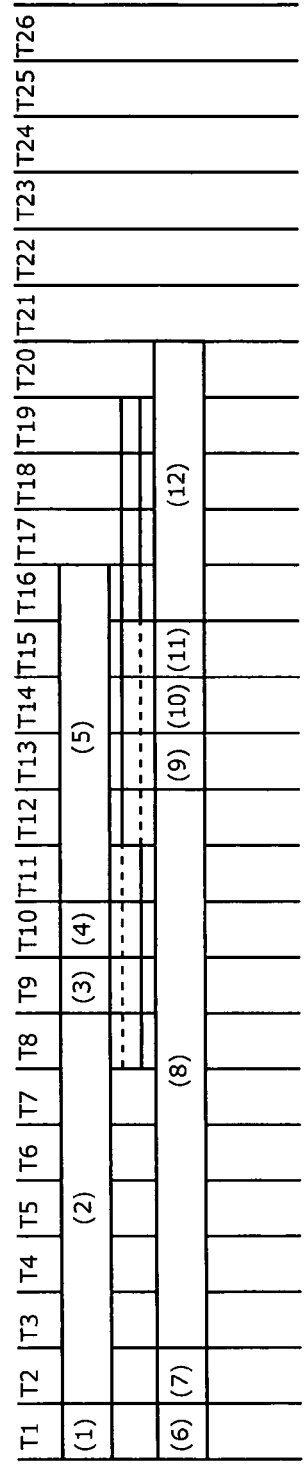

FIGS. 2A to 2C are diagrams for describing program execution time. In order to describe the problem of the conventional technology and the effect produced by the first embodiment, a comparison is made in FIGS. 2A to 2C among the following: execution time of the program 1 in the uniprocessor architecture (1); execution time of the program 1 in the case where the pseudo data coherence management units shown in FIG. 1 are not used in the uniprocessor architecture (2); and execution time of the program 1 in the case where the pseudo data coherence management units shown in FIG. 1 are used in the multiprocessor architecture (3).

The following description is given on the assumption that: all instructions are stored in the instruction local caches; no effective data is stored in the data local caches; the number of execution cycles required to execute a load/store instruction is (i) one cycle when there is a cache hit, (ii) one cycle when there is a cache miss in the own local cache and there is a cache hit in the other local cache, and (iii) seven cycles when there is a cache miss and thus an access is performed to the external memory; in the case where there is an access contention on the shared bus, additional one cycle is required for a cache-to-cache data transfer after the earlier access is completed; and the number of cycles required to transfer one cache line data is four cycles (note, however, that the transfer starts beginning with the critical word, and the shared bus is occupied during such transfer).

Referring to FIG. 1 and FIG. 2A, a description is given of the case where the program 1 is sequentially executed by the uniprocessor (from an instruction (1) to an instruction (5) executed by the processor 101 and then from an instruction (1) to an instruction (7) executed by the processor 102). The operations of the uniprocessor are described on the assumption that only the processor 101 shown in FIG. 1 is in operation.

The uniprocessor executes a register transfer instruction (1) in T1 shown in FIG. 2A. The instruction (1) is an instruction for storing address 0x40000000 into a register A0.

The uniprocessor executes a load instruction (2) in T2 shown in FIG. 2A. The instruction (2) is an instruction for reading (loading) the data onto a register D0 from a location specified by the address indicated by the register A0. The number of instruction execution cycles for the access performed in response to this instruction is seven cycles, from T2 to T8, since it is a cache miss access and there is no cache-to-cache data transfer or no bus contention.

The uniprocessor executes an add instruction (3) in T9 shown in FIG. 2A. The instruction (3) is an instruction for adding an immediate value 0x05 and the value in the register D0, and storing the addition result into the register D0.

The uniprocessor executes a register transfer instruction (4) in T10 shown in FIG. 2A. The instruction (4) is an instruction for storing address 0x40000100 into the register A1.

The uniprocessor executes a store instruction (5) in T11 shown in FIG. 2A. The instruction (5) is an instruction for storing the contents of the register D0 into a memory indicated by the register A1. The number of instruction execution cycles for the access performed in response to this instruction is seven cycles, from T11 to T17, since this is a cache miss access, and there is no cache-to-cache data transfer or no bus contention.

The uniprocessor executes a clear instruction (6) in T18 shown in FIG. 2A. The instruction (6) is an instruction for clearing the register D0 (setting the value of the register D0 to zero).

The uniprocessor executes a register transfer instruction (7) in T19 shown in FIG. 2A. The instruction (7) is an instruction for storing address 0x40000104 into the register A0.

The uniprocessor executes a load instruction (8) in T20 shown in FIG. 2A. The instruction (8) is an instruction for reading (loading) the data onto the register D0 from a location specified by the address indicated by the register A0. The number of instruction execution cycles for the access performed in response to this instruction is one cycle in T20 since it is a cache hit access.

The uniprocessor executes a register transfer instruction (9) in T21 shown in FIG. 2A. The instruction (9) is an instruction for storing address 0x40000004 into the register A1.

The uniprocessor executes a load instruction (10) in T22 shown in FIG. 2A. The instruction (10) is an instruction for reading (loading) the data onto the register D1 from a location specified by the address indicated by the register A1. The number of instruction execution cycles for the access performed in response to this instruction is one cycle in T22 since it is a cache hit access.

The uniprocessor executes an add instruction (11) in T23 shown in FIG. 2A. The instruction (11) is an instruction for adding the values in the register D1 and the register D0, and storing the addition result into the register D0.

The uniprocessor executes a store instruction (12) in T24 shown in FIG. 2A. The instruction (12) is an instruction for storing the contents of the register D0 into a memory indicated by the register A0. The number of instruction execution cycles for the access performed in response to this instruction is one cycle in T20 since it is a cache hit access.

As described above, 24 cycles are required in the case of executing the program 1 in the uniprocessor architecture.

Next, the following describes, as a first multiprocessor, a conventional snoopy cache using no pseudo data coherence management unit in the multiprocessor architecture.

In the first multiprocessor, the processor 101 executes a register transfer instruction (1) and the processor 102 executes a clear instruction (6) respectively in T1 shown in FIG. 2B. The instruction (1) is an instruction for storing address 0x40000000 into the register A0, and the instruction (6) is an instruction for clearing the register D0 (setting the value of the register D0 to zero).

In the first multiprocessor, the processor 101 executes a load instruction (2) and the processor 102 executes a register transfer instruction (7) respectively in T2 shown in FIG. 2B. The instruction (2) is an instruction for reading (loading) the data onto the register D0 from a location specified by the address indicated by the register A0, and the instruction (7) is an instruction for storing address 0x40000104 into the register A0. The cache access notification unit 144 of the processor 101 notifies the shared bus control unit 170 of the fact that a cache miss of a cacheable read access has occurred as a result of the access performed in response to the instruction (2). The cache access monitoring unit 165 of the processor 102 searches the cache memory 162 using, as a key, the same access details as those used by the processor 101 in response to the notification sent via the shared bus control unit 170. The processor 102 does not perform a cache-to-cache data transfer since it is a snoopy cache miss access. The shared bus control unit 170 is not required to wait for any cycles for a shared bus access since the shared bus 171 is not in use. Thus, the number of instruction execution cycles is seven cycles, from T2 to T8, and the shared bus 171 is to be occupied from T8 to T11 due to the cache refill access performed in response to the instruction (2).

In the first multiprocessor, while the processor 101 is executing the load instruction (2) in T3 shown in FIG. 2B, the processor 102 executes a load instruction (8). The instruction (8) is an instruction for reading (loading) the data onto the register D0 from a location specified by the address indicated by the register A0. The cache access notification unit 164 of the processor 102 notifies the shared bus control unit 170 of the fact that a cache miss of a cacheable read access has occurred as a result of the access performed in response to the instruction (8). The cache access monitoring unit 145 of the processor 101 searches the cache memory 142 using, as a key, the same access details as those used by the processor 102 in response to the notification sent via the shared bus control unit 170. The processor 101 does not perform a cache-to-cache data transfer since it is a snoopy cache miss access. The shared bus control unit 170 is required to wait for some cycles until it can perform a shared bus access since the shared bus 171 is in use. Thus, the number of instruction execution cycles is ten cycles, from T3 to T12, and the shared bus 171 is to be occupied from T12 to T15 due to the cache refill access performed in response to the instruction (8).

In the first multiprocessor, the processor 101 executes an add instruction (3) in T9 shown in FIG. 2B, while the processor 102 is executing the load instruction (8). The instruction (3) is an instruction for adding an immediate value 0x05 and the value in the register D0, and storing the addition result into the register D0.

In the first multiprocessor, the processor 101 executes a register transfer instruction (4) in T10 shown in FIG. 2B, while the processor 102 is executing the load instruction (8). The instruction (4) is an instruction for storing address 0x40000100 into the register A1.

In the first multiprocessor, the processor 101 executes a store instruction (5) and the processor 102 executes a register transfer instruction (9) respectively in T11 shown in FIG. 2B. The instruction (5) is an instruction for writing (storing) the contents of the register D0 into a memory indicated by the register A1. The cache access notification unit 144 of the processor 101 notifies the shared bus control unit 170 of the fact that a cache miss of a cacheable write access has occurred as a result of the access performed in response to the instruction (5). The cache access monitoring unit 165 of the processor 102 searches the cache memory 162 using, as a key, the same access details as those used by the processor 101 in response to the notification sent via the shared bus control unit 170. The data coherence management unit 166 of the processor 102 performs a cache-to-cache data transfer, and then invalidates the entry of such data since it is a snoopy cache hit access. The shared bus control unit 170 is required to wait for some cycles until it can perform a shared bus access since the shared bus 171 is in use. Thus, the number of instruction execution cycles is six cycles, from T11 to T16, and the shared bus 171 is to be occupied from T16 to T19 due to the cache refill access performed in response to the instruction (5).

In the first multiprocessor, while the processor 101 is executing the store instruction (5) in T13 shown in FIG. 2B, the processor 102 is executing the data transfer instruction (9). The instruction (9) is an instruction for storing address 0x40000004 into the register A1.

In the first multiprocessor, while the processor 101 is executing the store instruction (5) in T14 shown in FIG. 2B, the processor 102 executes a load instruction (10). The instruction (10) is an instruction for reading (loading) the data onto the register D1 from a location specified by the address indicated by the register A1. The cache access notification unit 164 of the processor 102 notifies the shared bus control unit 170 of the fact that a cache miss of a cacheable read access has occurred as a result of the access performed in response to the instruction (10). The cache access monitoring unit 145 of the processor 101 searches the cache memory 142 using, as a key, the same access details as those used by the processor 102 in response to the notification sent via the shared bus control unit 170. The data coherence management unit 146 of the processor 101 performs a cache-to-cache data transfer since it is a snoopy cache hit access. The shared bus control unit 170 is required to wait for some cycles until it can perform a shared bus access since the shared bus 171 is in use. Thus, the number of instruction execution cycles is seven cycles, from T14 to T20, and the shared bus 171 is to be occupied from T20 to T23 due to the cache refill access performed in response to the instruction (10).

In the first multiprocessor, the processor 102 executes an add instruction 11 in T21 shown in FIG. 2B. The instruction (11) is an instruction for adding the values in the register D1 and the register D0, and storing the addition result into the register D0.

In the first multiprocessor, the processor 102 executes a store instruction (12) in T22 shown in FIG. 2B. The instruction (12) is an instruction for writing (storing) the contents of the register D0 into a memory indicated by the register A0. The cache access notification unit 164 of the processor 102 notifies the shared bus control unit 170 of the fact that a cache miss of a cacheable write access has occurred as a result of the access performed in response to the instruction (12). The cache access monitoring unit 145 of the processor 101 searches the cache memory 142 using, as a key, the same access details as those used by the processor 102 in response to the notification sent via the shared bus control unit 170. The data coherence management unit 146 of the processor 101 performs a cache-to-cache data transfer, and then invalidates the entry of such data since it is a snoopy cache hit access. The shared bus control unit 170 is required to wait for some cycles until it can perform a shared bus access since the shared bus 171 is in use. Thus, the number of instruction execution cycles is three cycles, from T22 to T24, and the shared bus 171 is to be occupied from T24 to T27 due to the cache write access performed in response to the instruction (12).

As described above, 24 cycles are required in the case of executing the program 1 in the first multiprocessor architecture.

Finally, the following describes, as a second multiprocessor, the first embodiment using the pseudo data coherence management units in the multiprocessor architecture.

In the second multiprocessor, the processor 101 executes a register transfer instruction (1) and the processor 102 executes a clear instruction (6) respectively in T1 shown in FIG. 2C. The instruction (1) is an instruction for storing address 0x40000000 into the register A0, and the instruction (6) is an instruction for clearing the register D0 (setting the value of the register D0 to zero).

In the second multiprocessor, the processor 101 executes a load instruction (2) and the processor 102 executes a register transfer instruction (7) respectively in T2 shown in FIG. 2C. The instruction (2) is an instruction for reading (loading) the data onto the register D0 from a location specified by the address indicated by the register A0, and the instruction (7) is an instruction for storing address 0x40000104 into the register A0. The cache access notification unit 144 of the processor 101 notifies the shared bus control unit 170 of the fact that a cache miss of a cacheable read access has occurred as a result of the access performed in response to the instruction (2). The cache access monitoring unit 165 of the processor 102 searches the cache memory 162 using, as a key, the same access details as those used by the processor 101 in response to the notification sent via the shared bus control unit 170. The data coherence management unit 166 of the processor 102 does not perform a cache-to-cache data transfer since it is a snoopy cache miss access. The pseudo data coherence management unit 167 of the processor 102 issues, to the shared bus control unit 170, an external memory read request for performing a cache refill access. As a result, the cache memories 142 and 162 of the respective processors 101 and 102 are refilled. The shared bus control unit 170 is not required to wait for any cycles for a shared bus access since the shared bus 171 is not in use. Thus, the number of instruction execution cycles is seven cycles, from T2 to T8, and the shared bus 171 is to be occupied from T8 to T11 due to the cache refill access performed in response to the instruction (2).

In the second multiprocessor, while the processor 101 is executing the load instruction (2) in T3 shown in FIG. 2C, the processor 102 executes a load instruction (8). The instruction (8) is an instruction for reading (loading) the data onto the register D0 from a location specified by the address indicated by the register A0. The cache access notification unit 164 of the processor 102 notifies the shared bus control unit 170 of the fact that a cache miss of a cacheable read access has occurred as a result of the access performed in response to the instruction (8). The cache access monitoring unit 145 of the processor 101 searches the cache memory 142 using, as a key, the same access details as those used by the processor 102 in response to the notification sent via the shared bus control unit 170. The data coherence management unit 146 of the processor 101 does not perform a cache-to-cache data transfer since it is a snoopy cache miss access. The pseudo data coherence management unit 147 of the processor 101 issues, to the shared bus control unit 170, an external memory read request for performing a cache refill access. As a result, the cache memories 142 and 162 of the respective processors 101 and 102 are refilled. The shared bus control unit 170 is required to wait for some cycles until it can perform a shared bus access since the shared bus 171 is in use. Thus, the number of instruction execution cycles is ten cycles, from T3 to T12, and the shared bus 171 is to be occupied from T12 to T15 due to the cache refill access performed in response to the instruction (8).

In the second multiprocessor, the processor 101 executes an add instruction (3) in T9 shown in FIG. 2C, while the processor 102 is executing the load instruction (8). The instruction (3) is an instruction for adding an immediate value 0x05 and the value in the register D0, and storing the addition result into the register D0.

In the second multiprocessor, the processor 101 executes a register transfer instruction (4) in T10 shown in FIG. 2C, while the processor 102 is executing the load instruction (8). The instruction (4) is an instruction for storing address 0x40000100 into the register A1.

In the second multiprocessor, the processor 101 executes a store instruction (5) and the processor 102 executes a register transfer instruction (9) respectively in T11 shown in FIG. 2C. The instruction (5) is an instruction for writing (storing) the contents of the register D0 into a memory indicated by the register A1. The cache access notification unit 144 of the processor 101 notifies the shared bus control unit 170 of the fact that a cache miss of a cacheable write access has occurred as a result of the access performed in response to the instruction (5). The cache access monitoring unit 165 of the processor 102 searches the cache memory 162 using, as a key, the same access details as those used by the processor 101 in response to the notification sent via the shared bus control unit 170. The data coherence management unit 166 of the processor 102 performs a cache-to-cache data transfer, and then invalidates the entry of such data since it is a snoopy cache hit access. The shared bus control unit 170 is required to wait for some cycles until it can perform a shared bus access since the shared bus 171 is in use. Thus, the number of instruction execution cycles is six cycles, from T11 to T16, and the shared bus 171 is to be occupied from T16 to T19 due to the cache refill access performed in response to the instruction (5).

In the second multiprocessor, while the processor 101 is executing the store instruction (5) in T13 shown in FIG. 2C, the processor 102 is executing the data transfer instruction (9). The instruction (9) is an instruction for storing address 0x40000004 into the register A1.

In the second multiprocessor, while the processor 101 is executing the store instruction (5) in T14 shown in FIG. 2C, the processor 102 executes a load instruction (10). The instruction (10) is an instruction for reading (loading) the data onto the register D1 from a location specified by the address indicated by the register A1. The access that is performed in response to the instruction (10) is a cache hit of a cacheable read access since the pseudo data coherence management unit 167 of the processor 102 issues a refill request to the cache memory 162 in response to the instruction (2) executed in T2 shown in FIG. 2C. Thus, the number of instruction execution cycles is one cycle in T14.

In the second multiprocessor, the processor 102 executes an add instruction (11) in T15 shown in FIG. 2C. The instruction (11) is an instruction for adding the values in the register D1 and the register D0, and storing the addition result into the register D0.

In the second multiprocessor, the processor 102 executes a store instruction (12) in T16 shown in FIG. 2C. The instruction (12) is an instruction for writing (storing) the contents of the register D0 into a memory indicated by the register A0. The cache access notification unit 164 of the processor 102 notifies the shared bus control unit 170 of the fact that a cache miss of a cacheable write access has occurred as a result of the access performed in response to the instruction (12). The cache access monitoring unit 145 of the processor 101 searches the cache memory 142 using, as a key, the same access details as those used by the processor 102 in response to the notification sent via the shared bus control unit 170. The data coherence management unit 146 of the processor 101 performs a cache-to-cache data transfer, and then invalidates the entry of such data since it is a snoopy cache hit access. The shared bus control unit 170 is required to wait for some cycles until it can perform a shared bus access since the shared bus 171 is in use. Thus, the number of instruction execution cycles is five cycles, from T16 to T20, and the shared bus 171 is to be occupied from T20 to T23 due to the cache write access performed in response to the instruction (12).

As described above, 20 cycles are required in the case of executing the program 1 in the second multiprocessor architecture.

As described above, it is shown, from the above comparison between the case of executing the program 1 in the multiprocessor architecture and the case of sequentially executing instructions described in the program 1 (instructions (1) to (5) are executed by the processor 101 first, and then instructions (1) to (7) are executed by the processor 102) in the uniprocessor architecture, that the instruction (3), instruction (5), and instruction (7) executed by the processor 102 result in a cache miss although these instructions are conventionally expected to result in a cache hit owing to the effects of reference locality and temporal locality. Since a refill access to the external memory as well as a snoopy access to (data sharing with) the processor 101 occur, it is deemed that the effect attributable to cache locality is reduced. Thus, by making a shared use of a refill request between the processors using the pseudo data coherence management units, it is possible to prevent the decrease in the reference locality and temporal locality of the local caches that accompanies the multiprocessor architecture.

Note that the first embodiment has been described on the basis of the two processors, but the present invention is not limited to this structure. The same constituent elements described above enable data to be refilled to two or more cache memories simultaneously in the case where there are three or more processors. In the case where one of the pseudo data coherence management units has issued a refill request to two or more local caches, a more powerful effect is produced by sending, to the external memory, one refill access request that is generated by the shared bus control unit by merging refill access requests issued by the same cache access notification unit.

Note that the first embodiment describes only cache-to-cache data transfer carried out between the data local caches for the purpose of simplifying illustrations, but the present invention is not limited to this structure.

Second Embodiment

However, in the case where the operations of the above-described pseudo data coherence management units are kept enabled at all times, while it is possible to prevent the decrease in cache locality, it is considered that there occurs a problem related to the reduction in cache capacity since the rate of data sharing increases. In view of this, referring to FIG. 3, FIG. 4, and FIG. 15B showing a program 2, a description is given of a multiprocessor that does not make an unnecessary shared use of cache capacity as compared with the first embodiment.

FIG. 3 is a functional block diagram showing the multiprocessor according to the present embodiment. In the multiprocessor of the present embodiment, CPUs 311 and 312 further include first pseudo data coherence management request units 381 and 382, respectively, in addition to the constituent elements of the multiprocessor shown in FIG. 1. The first pseudo data coherence management request units 381 and 382 are connected to the shared bus control unit 370, via which the first pseudo data coherence management request units 381 and 382 are connected to the pseudo data coherence management units 337, 347, 357, and 367 of the respective local caches, as in the case of the cache access notification units 334, 344, 354, and 364.

The pseudo data coherence management units 337, 347, 357, and 367 launch an operation to read data from the external memory to refill their respective local caches by operating as if the cache memories 332, 342, 352, and 362 of their respective local caches already stored the same data as the data accessed by another local cache only in the case of detecting that a first pseudo data coherence management request signal (hereinafter also referred to simply as "first request signal") outputted from the first pseudo data coherence management request unit 381 or 382 is active.

Figure 4:
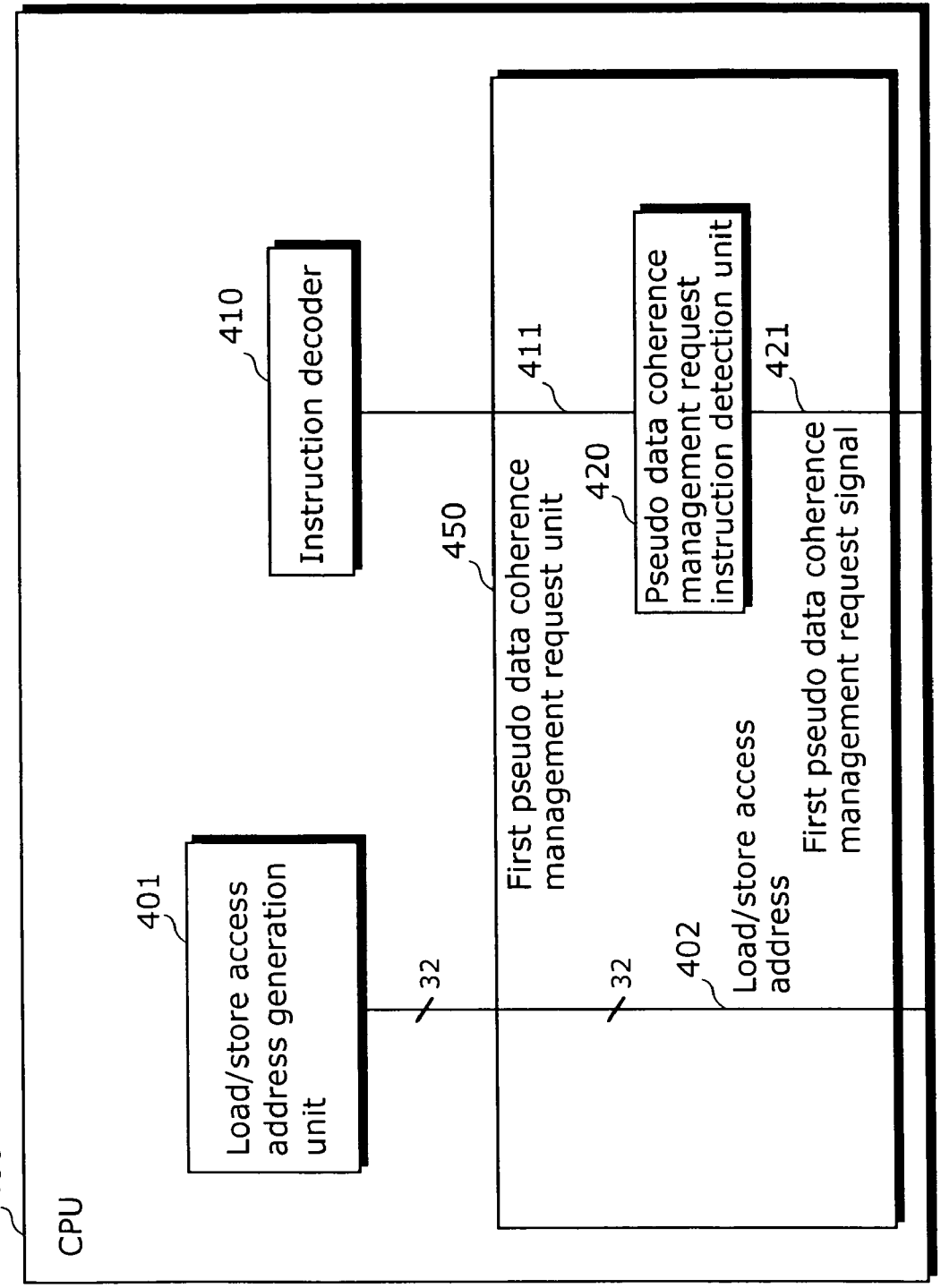
FIG. 4 is a diagram showing a structure of a first pseudo data coherence management request unit.

FIG. 4 is a diagram showing the structure of each of the first pseudo data coherence management request units 381 and 382 shown in FIG. 3. FIG. 4 depicts functional blocks related to each of the first pseudo data coherence management request units 381 and 382 in the respective CPUs 311 and 312 shown in FIG. 3. Each CPU 400 includes: a load/store access address generation unit 401 that generates a load/store access address 402 when a load/store access is performed; an instruction decoder 410 that decodes an instruction; and a first pseudo data coherence management request unit 450 having a pseudo data coherence management request instruction detection unit (hereinafter also referred to simply as "instruction detection unit") 420 that generates a first pseudo data coherence management request signal (hereinafter also referred to simply as "first request signal") 421 based on an output from the instruction decoder 410. The load/store access address 402 and the first request signal 421 generated here are respectively outputted to one of the local caches 331, 341, 351, and 361 and then to the shared bus control unit 370.

FIG. 15B is a diagram showing the program 2 according to the second embodiment. In FIG. 15B, instructions executed by the processor 301 and instructions executed by the processor 302 are illustrated side by side. The program 2 is different from the program 1 only in the instruction (2), instruction (8), and instruction (10), each of which is a MOVC instruction. When the instruction decoder 410 decodes these instructions, the instruction detection unit 420 of each CPU generates a first request signal 421 in accordance with the output from the instruction decoder 410, and outputs such generated signal to the shared bus control unit 370.

Referring to FIG. 2C, FIG. 3, FIG. 4, and FIG. 15B showing the program 2, the following describes a third multiprocessor that uses the pseudo data coherence management request instruction detection units and the pseudo data coherence management units.

In the third multiprocessor, the processor 301 executes a register transfer instruction (1) and the processor 302 executes a clear instruction (6) respectively in T1 shown in FIG. 2C. The instruction (1) is an instruction for storing address 0x40000000 into the register A0, and the instruction (6) is an instruction for clearing the register D0 (setting the value of the register D0 to zero).

In the third multiprocessor, the processor 301 executes a load instruction (2) and the processor 302 executes a register transfer instruction (7) respectively in T2 shown in FIG. 2C. The instruction (2) is an instruction for reading (loading) the data onto the register D0 from a location specified by the address indicated by the register A0, and the instruction (7) is an instruction for storing address 0x40000104 into the register A0. As shown in FIG. 4, the CPU 400 (311 in FIG. 3) includes the load/store access address generation unit 401 that generates a load/store access address and the first pseudo data coherence management request unit 450 that activates the first pseudo data coherence management request signal, and the first pseudo data coherence management request unit 450 includes the pseudo data coherence management request instruction detection unit 420. This instruction detection unit 420 detects that the instruction (2) is an instruction for which the first pseudo data coherence management request signal should be activated by monitoring a result outputted from the instruction decoder 410, and notifies this detection to the shared bus control unit 370. The cache access notification unit of the processor 301 notifies the shared bus control unit 370 of the fact that a cache miss of a cacheable read access has occurred. The cache access monitoring unit of the processor 302 searches the cache memory using, as a key, the same access details as those used by the processor 301 in response to the notification sent via the shared bus control unit 370. The data coherence management unit of the processor 302 does not perform a cache-to-cache data transfer since it is a snoopy cache miss access. In order to receive an active first pseudo data coherence management request signal from the shared bus control unit 370, the pseudo data coherence management unit of the processor 302 issues, to the shared bus control unit 370, an external memory read request for performing a cache refill access. As a result, the cache memories of the respective processors 301 and 302 are refilled. The shared bus control unit 370 is not required to wait for any cycles for a shared bus access since the shared bus 371 is not in use. Thus, the number of instruction execution cycles is seven cycles, from T2 to T8, and the shared bus 371 is to be occupied from T8 to T11 due to the cache refill access performed in response to the instruction (2).

In the third multiprocessor, while the processor 301 is executing the load instruction (2) in T3 shown in FIG. 2C, the processor 302 executes a load instruction (8). The instruction (8) is an instruction for reading (loading) the data onto the register D0 from a location specified by the address indicated by the register A0. As shown in FIG. 4, the CPU 400 (312 in FIG. 3) includes the load/store access address generation unit 401 that generates a load/store access address and the first pseudo data coherence management request unit 450 that activates the first pseudo data coherence management request signal 421, and the first pseudo data coherence management request unit 450 includes the pseudo data coherence management request instruction detection unit 420. This instruction detection unit 420 detects that the instruction 8 is an instruction for which the first pseudo data coherence management request signal should be activated by monitoring a result outputted from the instruction decoder 410, and notifies this detection to the shared bus control unit 370. The cache access monitoring unit of the processor 301 searches the cache memory using, as a key, the same access details as those used by the processor 302 in response to the notification sent via the shared bus control unit 370. The data coherence management unit of the processor 301 does not perform a cache-to-cache data transfer since it is a snoopy cache miss access. In order to receive an active first pseudo data coherence management request signal from the shared bus control unit 370, the pseudo data coherence management unit of the processor 301 issues, to the shared bus control unit 370, an external memory read request for performing a cache refill access. As a result, the cache memories of the respective processors 301 and 302 are refilled. The shared bus control unit 370 is required to wait for some cycles until it can perform a shared bus access since the shared bus 371 is in use. Thus, the number of instruction execution cycles is ten cycles, from T3 to T12, and the shared bus 371 is to be occupied from T12 to T15 due to the cache refill access performed in response to the instruction (8).

In the third multiprocessor, the processor 301 executes an add instruction (3) in T9 shown in FIG. 2C, while the processor 302 is executing the load instruction (8). The instruction (3) is an instruction for adding an immediate value 0x05 and the value in the register D0, and storing the addition result into the register D0.

In the third multiprocessor, the processor 301 executes a register transfer instruction (4) in T10 shown in FIG. 2C, while the processor 302 is executing the load instruction (8). The instruction (4) is an instruction for storing address 0x40000100 into the register A1.

In the third multiprocessor, the processor 301 executes a store instruction (5) and the processor 302 executes a register transfer instruction (9) respectively in T11 shown in FIG. 2C. The instruction (5) is an instruction for writing (storing) the contents of the register D0 into a memory indicated by the register A1. The cache access notification unit of the processor 301 notifies the shared bus control unit 370 of the fact that a cache miss of a cacheable write access has occurred as a result of the access performed in response to the instruction (5). The cache access monitoring unit of the processor 302 searches the cache memory using, as a key, the same access details as those used by the processor 301 in response to the notification sent via the shared bus control unit 370. The data coherence management unit of the processor 302 performs a cache-to-cache data transfer, and then invalidates the entry of such data since it is a snoopy cache hit access. The shared bus control unit 370 is required to wait for some cycles until it can perform a shared bus access since the shared bus 371 is in use. Thus, the number of instruction execution cycles is six cycles, from T11 to T16, and the shared bus 371 is to be occupied from T16 to T19 due to the cache refill access performed in response to the instruction (5).

In the third multiprocessor, while the processor 301 is executing the store instruction (5) in T13 shown in FIG. 2C, the processor 302 is executing the data transfer instruction (9). The instruction (9) is an instruction for storing address 0x40000004 into the register A1.

In the third multiprocessor, while the processor 301 is executing the store instruction (5) in T14 shown in FIG. 2C, the processor 302 executes a load instruction (10). The instruction (10) is an instruction for reading (loading) the data onto the register D1 from a location specified by the address indicated by the register A1. The access that is performed in response to the instruction (10) is a cache hit of a cacheable read access since the pseudo data coherence management unit of the processor 302 issues a refill request to the cache memory in response to the instruction (2) executed in T2 shown in FIG. 2C. Thus, the number of instruction execution cycles is one cycle in T14.

In the third multiprocessor, the processor 302 executes an add instruction (11) in T15 shown in FIG. 2C. The instruction (11) is an instruction for adding the values in the register D1 and the register D0, and storing the addition result into the register D0.

In the third multiprocessor, the processor 302 executes a store instruction (12) in T16 shown in FIG. 2C. The instruction (12) is an instruction for writing (storing) the contents of the register D0 into a memory indicated by the register A0. The cache access notification unit of the processor 302 notifies the shared bus control unit 370 of the fact that a cache miss of a cacheable write access has occurred as a result of the access performed in response to the instruction (12). The cache access monitoring unit of the processor 301 searches the cache memory using, as a key, the same access details as those used by the processor 302 in response to the notification sent via the shared bus control unit 370. The data coherence management unit of the processor 301 performs a cache-to-cache data transfer, and then invalidates the entry of such data since it is a snoopy cache hit access. The shared bus control unit 370 is required to wait for some cycles until it can perform a shared bus access since the shared bus 371 is in use. Thus, the number of instruction execution cycles is five cycles, from T16 to T20, and the shared bus 371 is to be occupied from T20 to T23 due to the cache write access performed in response to the instruction (12).

As described above, 20 cycles are required in the case of executing the program 2 in the third multiprocessor architecture. What is more, it is possible to prevent unnecessary sharing of data attributable to the pseudo data coherence management units intended for preventing the decrease in cache locality since it is ensured that the operations of such pseudo data coherence management units are not enabled unless an instruction code is for enabling the operations of the pseudo data coherence management units.

By adding instruction codes, the second embodiment achieves the prevention of the decrease in cache locality attributable to the pseudo data coherence management units as well as the reduction of wasteful use of cache capacity (shared use of unnecessary data) attributable to the structure of the first embodiment.

Note that the instructions presented in the second embodiment are written in the assembly language, but the present invention is not limited to this. Therefore, by setting reserved words written in the C language, for example, it is possible to output, using a complier, the instructions of the present embodiment written in the assembly language as well as to achieve the same effect by linking and calling a library written in the assembly language Note that the second embodiment describes only cache-to-cache data transfer carried out between the data local caches for the purpose of simplifying illustrations, but the present invention is not limited to this structure.

Third Embodiment

However, the addition of instruction codes results in a problem of compatibility and the like since such addition is equivalent to changing of the architecture. In view of this, referring to FIG. 3, FIG. 5, and FIG. 15A showing the program 1, a description is given of a multiprocessor that reduces a wasteful use of cache capacity (shared use of unnecessary data) without adding any special set of instructions, as compared with the second embodiment.

Figure 5:
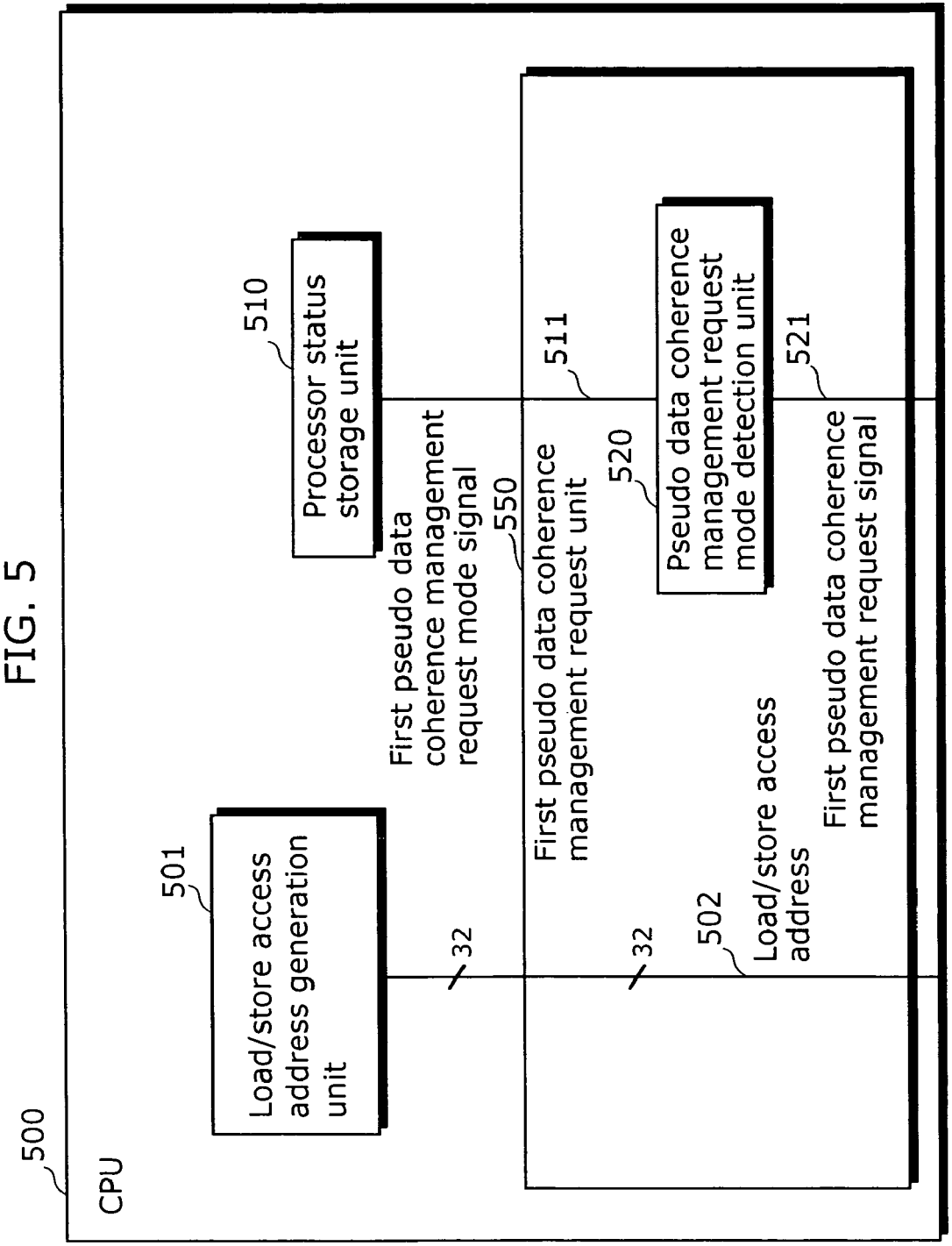
FIG. 5 is a diagram showing a structure of a first pseudo data coherence management request unit according to a third embodiment.

FIG. 5 is a diagram showing the structure of each of the first pseudo data coherence management request units 381 and 382 shown in FIG. 3. FIG. 5 depicts functional blocks related to each of the first pseudo data coherence management request units 381 and 382 in the respective CPUs 311 and 312 shown in FIG. 3. Each CPU 500 includes: a load/store access address generation unit 501 that generates a load/store access address 502 when a load/store access is performed; a processor status storage unit 510 that indicates a status of the processor at instruction execution time; and a first pseudo data coherence management request unit 550 having a pseudo data coherence management request mode detection unit (hereinafter also referred to simply as "mode detection unit") 520 that generates a first pseudo data coherence management request mode signal (hereinafter also referred to simply as "mode signal") 521, based on an output from the processor status storage unit 510. The load/store access address 502 and the mode signal 521 generated here are respectively outputted to one of the local caches 331, 341, 351, and 361 and then to the shared bus control unit 370.

FIG. 15A is a diagram showing the program 1 according to the third embodiment. In FIG. 15A, instructions executed by the processor 301 and instructions executed by the processor 302 are illustrated side by side.

Referring to FIG. 2C, FIG. 3, FIG. 5, and FIG. 15A showing the program 1, the following describes a fourth multiprocessor that uses the processor status storage units and the first pseudo data coherence management request units in the multiprocessor architecture.

In the fourth multiprocessor, the processor 301 executes a register transfer instruction (1) and the processor 302 executes a clear instruction (6) respectively in T1 shown in FIG. 2C. The instruction (1) is an instruction for storing address 0x40000000 into the register A0, and the instruction (6) is an instruction for clearing the register D0 (setting the value of the register D0 to zero).

In the fourth multiprocessor, the processor 301 executes a load instruction (2) and the processor 302 executes a register transfer instruction (7) respectively in T2 shown in FIG. 2C. The instruction (2) is an instruction for reading (loading) the data onto the register D0 from a location specified by the address indicated by the register A0, and the instruction (7) is an instruction for storing address 0x40000104 into the register A0. As shown in FIG. 5, the CPU 500 (311 in FIG. 3) includes the load/store access address generation unit 501 that generates a load/store access address and the first pseudo data coherence management request unit 550 that activates the first pseudo data coherence management request mode signal, and the first pseudo data coherence management request unit 550 includes the pseudo data coherence management request mode detection unit 520. This mode detection unit 520 detects that the instruction (2) is an instruction for which the mode signal 521 should be activated by monitoring the processor status indicated by the processor status storage unit 510, and notifies this detection to the shared bus control unit 370. The cache access notification unit of the processor 301 notifies the shared bus control unit 370 of the fact that a cache miss of a cacheable read access has occurred. The cache access monitoring unit of the processor 302 searches the cache memory using, as a key, the same access details as those used by the processor 301 in response to the notification sent via the shared bus control unit 370. The data coherence management unit of the processor 302 does not perform a cache-to-cache data transfer since it is a snoopy cache miss access. In order to receive an active first pseudo data coherence management request mode signal from the shared bus control unit 370, the pseudo data coherence management unit of the processor 302 issues, to the shared bus control unit 370, an external memory read request for performing a cache refill access. As a result, the cache memories of the respective processors 301 and 302 are refilled. The shared bus control unit 370 is not required to wait for any cycles for a shared bus access since the shared bus 371 is not in use. Thus, the number of instruction execution cycles is seven cycles, from T2 to T8, and the shared bus 371 is to be occupied from T8 to T11 due to the cache refill access performed in response to the instruction (2).

In the fourth multiprocessor, while the processor 301 is executing the load instruction (2) in T3 shown in FIG. 2C, the processor 302 executes a load instruction (8). The instruction (8) is an instruction for reading (loading) the data onto the register D0 from a location specified by the address indicated by the register A0. As shown in FIG. 5, the CPU 500 (312 in FIG. 3) includes the load/store access address generation unit 501 that generates a load/store access address and the first pseudo data coherence management request unit 550 that activates the first pseudo data coherence management request mode signal, and the first pseudo data coherence management request unit 550 includes the pseudo data coherence management request mode detection unit 520. This mode detection unit 520 detects that the instruction 8 is an instruction for which the pseudo data coherence management request mode signal should be activated by monitoring the processor status indicated by the processor status storage unit 510, and notifies this detection to the shared bus control unit 370. The cache access notification unit of the processor 302 notifies the shared bus control unit 370 of the fact that a cache miss of a cacheable read access has occurred. The cache access monitoring unit of the processor 301 searches the cache memory using, as a key, the same access details as those used by the processor 302 in response to the notification sent via the shared bus control unit 370. The data coherence management unit of the processor 301 does not perform a cache-to-cache data transfer since it is a snoopy cache miss access. In order to receive an active first pseudo data coherence management request mode signal from the shared bus control unit 370, the pseudo data coherence management unit of the processor 301 issues, to the shared bus control unit 370, an external memory read request for performing a cache refill access. As a result, the cache memories of the respective processors 301 and 302 are refilled. The shared bus control unit 370 is required to wait for some cycles until it can perform a shared bus access since the shared bus 371 is in use. Thus, the number of instruction execution cycles is ten cycles, from T3 to T12, and the shared bus 371 is to be occupied from T12 to T15 due to the cache refill access performed in response to the instruction (8).

In the fourth multiprocessor, the processor 301 executes an add instruction (3) in T9 shown in FIG. 2C, while the processor 302 is executing the load instruction (8). The instruction (3) is an instruction for adding an immediate value 0x05 and the value in the register D0, and storing the addition result into the register D0.

In the fourth multiprocessor, the processor 301 executes a register transfer instruction (4) in T10 shown in FIG. 2C, while the processor 302 is executing the load instruction (8). The instruction (4) is an instruction for storing address 0x40000100 into the register A1.

In the fourth multiprocessor, the processor 301 executes a store instruction (5) and the processor 302 executes a register transfer instruction (9) respectively in T11 shown in FIG. 2C. The instruction (5) is an instruction for writing (storing) the contents of the register D0 into a memory indicated by the register A1. The cache access notification unit of the processor 301 notifies the shared bus control unit 370 of the fact that a cache miss of a cacheable write access has occurred as a result of the access performed in response to the instruction (5). The cache access monitoring unit of the processor 302 searches the cache memory using, as a key, the same access details as those used by the processor 301 in response to the notification sent via the shared bus control unit 370. The data coherence management unit of the processor 302 performs a cache-to-cache data transfer, and then invalidates the entry of such data since it is a snoopy cache hit access. The shared bus control unit 370 is required to wait for some cycles until it can perform a shared bus access since the shared bus 371 is in use. Thus, the number of instruction execution cycles is six cycles, from T11 to T16, and the shared bus 371 is to be occupied from T16 to T19 due to the cache refill access performed in response to the instruction (5).

In the fourth multiprocessor, while the processor 301 is executing the store instruction (5) in T13 shown in FIG. 2C, the processor 302 is executing the data transfer instruction (9). The instruction (9) is an instruction for storing address 0x40000004 into the register A1.

In the fourth multiprocessor, while the processor 301 is executing the store instruction (5) in T14 shown in FIG. 2C, the processor 302 executes a load instruction (10). The instruction (10) is an instruction for reading (loading) the data onto the register D1 from a location specified by the address indicated by the register A1. The access that is performed in response to the instruction (10) is a cache hit of a cacheable read access since the pseudo data coherence management unit of the processor 302 issues a refill request to the cache memory in response to the instruction (2) executed in T2 shown in FIG. 2C. Thus, the number of instruction execution cycles is one cycle in T14.

In the fourth multiprocessor, the processor 302 executes an add instruction (11) in T15 shown in FIG. 2C. The instruction (11) is an instruction for adding the values in the register D1 and the register D0, and storing the addition result into the register D0.

In the fourth multiprocessor, the processor 302 executes a store instruction (12) in T16 shown in FIG. 2C. The instruction (12) is an instruction for writing (storing) the contents of the register D0 into a memory indicated by the register A0. The cache access notification unit of the processor 302 notifies the shared bus control unit 370 of the fact that a cache miss of a cacheable write access has occurred as a result of the access performed in response to the instruction (12). The cache access monitoring unit of the processor 301 searches the cache memory using, as a key, the same access details as those used by the processor 302 in response to the notification sent via the shared bus control unit 370. The data coherence management unit of the processor 301 performs a cache-to-cache data transfer, and then invalidates the entry of such data since it is a snoopy cache hit access. The shared bus control unit 370 is required to wait for some cycles until it can perform a shared bus access since the shared bus 371 is in use. Thus, the number of instruction execution cycles is five cycles, from T16 to T20, and the shared bus 371 is to be occupied from T20 to T23 due to the cache write access performed in response to the instruction (12).

As described above, 20 cycles are required in the case of executing the program 1 in the fourth multiprocessor architecture. What is more, it is possible to prevent unnecessary sharing of data attributable to the pseudo data coherence management units intended for preventing the decrease in cache locality, without adding any instruction sets, since it is ensured that the operations of such pseudo data coherence management units are not enabled depending on an output from the processor status storage units.

By additionally including the processor status storage units and enabling the operations of the pseudo data coherence management units based on the first pseudo data coherence management request mode signal that is generated based on an output of the processor status storage units, the third embodiment achieves the prevention of the decrease in cache locality attributable to the pseudo data coherence management units as well as the reduction of wasteful use of cache capacity (shared use of unnecessary data) attributable to the structure of the second embodiment, without being limited to instruction codes.

Note that, in the third embodiment, the first pseudo data coherence management request mode signal that is set based on an output of the processor status storage unit 510 is described as being kept enabled even after the execution of a load/store instruction, but the present invention is not limited to this structure. Therefore, the mode signal may be cleared, for example, after the execution of the load/store instruction or may be cleared according to a lock signal indicating whether to clear or lock the mode signal after the execution of the load/store instruction. When the lock signal is set to "lock", for example, it is possible to keep the mode signal and the first pseudo data coherence management request signal activated while a load/store instruction is being executed for a predetermined number of times.

Note that the third embodiment describes only cache-to-cache data transfer carried out between the data local caches for the purpose of simplifying illustrations, but the present invention is not limited to this structure.

Fourth Embodiment

However, the use of the processor status storage units to switch the setting of the pseudo data coherence management units results in the decrease in the efficiency of instruction execution since it is sometimes necessary to rewrite a processor status stored in the processor status storage units on a load/store instruction 2 basis. It is deemed, therefore, that reduction in wasteful use of cache capacity cannot be made sufficiently only by controlling the pseudo data coherence management units by use of the processor status storage units of the third embodiment. In view of this, referring to FIG. 2C, FIG. 3, FIG. 6, FIG. 7, FIG. 8, FIG. 9, and FIG. 15C showing a program 3, a description is given of a multiprocessor that reduces wasteful use of cache capacity (shared use of unnecessary data) without adding any special instruction codes, by being equipped with pseudo data coherence management request space judgment units that judge whether or not to enable the operations of the pseudo data coherence management units according to a space of a logical address specified by a load/store instruction.

Figure 6:
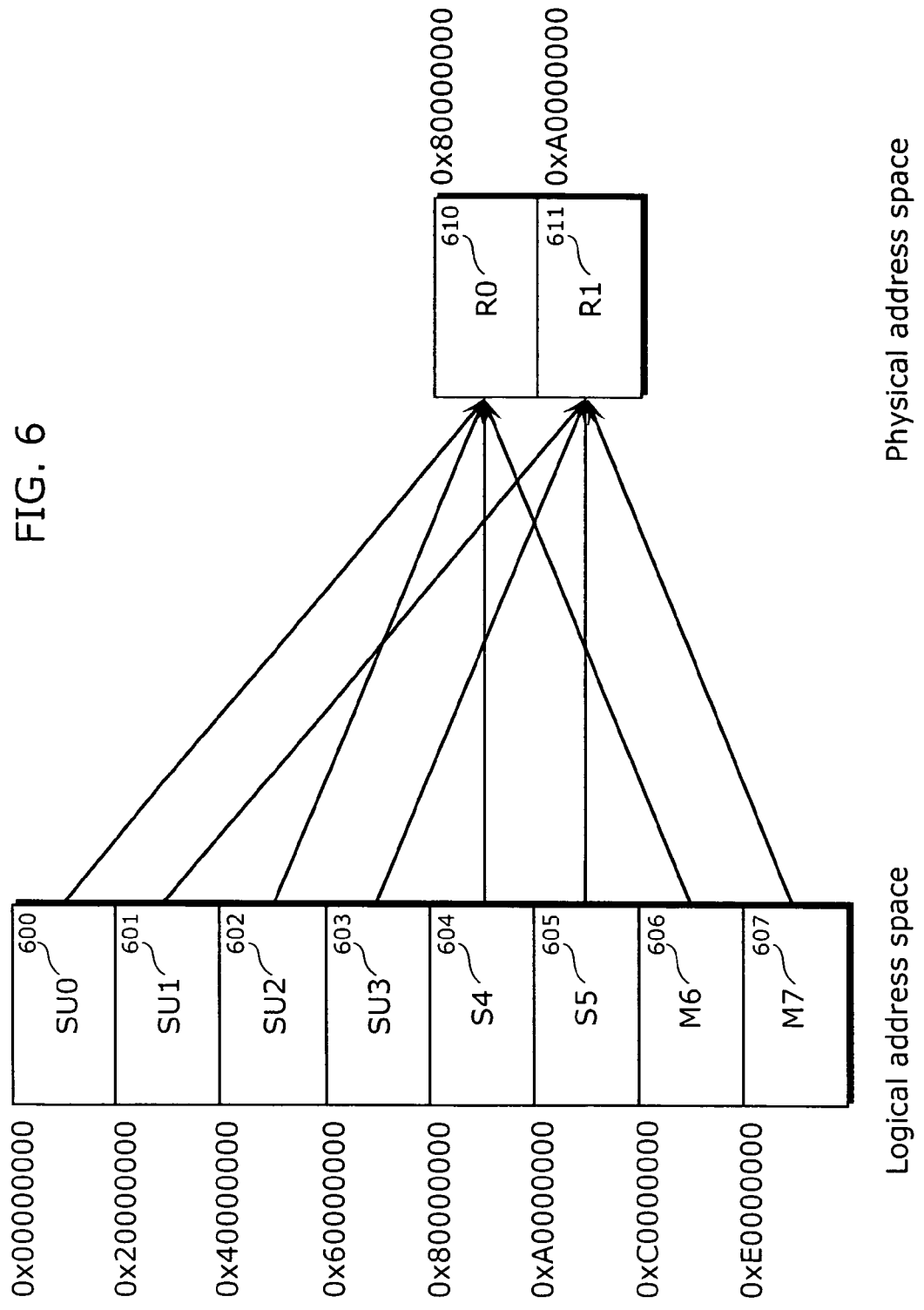
FIG. 6 is a diagram showing a mapping rule for mapping a logical address space to a physical address space according to a fourth embodiment.

FIG. 6 is a diagram showing a mapping rule for mapping a logical address space to a physical address space in response to an access to such logical address space. Logical addressees in a range from 0x00000000 to 0xFFFFFFFF are used as logical addresses generated by the CPUs as load/store instructions.

Logical addresses 0x00000000 to 0x1FFFFFFF, which form an SU0 space 600 accessible at the supervisor level and user level, are mapped to an R0 space 610 starting with the physical address 0x80000000 and ending with the physical address 0x9FFFFFFF. The first pseudo data coherence management request signal is not activated for addresses in this SU0 space 600. Logical addresses 0x20000000 to 0x3FFFFFFF, which form an SU1 space 601 accessible at the supervisor level and user level, are mapped to an R1 space 611 starting with the physical address 0xA0000000 and ending with the physical address 0xBFFFFFFF. The first pseudo data coherence management request signal is not activated for addresses in this SU1 space 601. Logical addresses 0x40000000 to 0x5FFFFFFF, which form an SU2 space 602 accessible at the supervisor level and user level, are mapped to the R0 space 610 starting with the physical address 0x80000000 and ending with the physical address 0x9FFFFFFF. The first pseudo data coherence management request signal is activated for addresses in this SU2 space 602. Logical addresses 0x60000000 to 0x7FFFFFFF, which form an SU3 space 603 accessible at the supervisor level and user level, are mapped to the R1 space 611 starting with the physical address 0xA0000000 and ending with the physical address 0xBFFFFFFF. The first pseudo data coherence management request signal is activated for addresses in this SU3 space 603. Logical addresses 0x80000000 to 0x9FFFFFFF, which form an S4 space 604 accessible at the supervisor level, are mapped to the R0 space 610 starting with the physical address 0x80000000 and ending with the physical address 0x9FFFFFFF. The first pseudo data coherence management request signal is not activated for addresses in this S4 space 604. Logical addresses 0xA0000000 to 0xBFFFFFFF, which form an S5 space 605 accessible at the supervisor level, are mapped to the R1 space 611 starting with the physical address 0xA0000000 and ending with the physical address 0xBFFFFFFF. The first pseudo data coherence management request signal is not activated for addressees in this S5 space 605. Logical addresses 0xC0000000 to 0xDFFFFFFF, which form an M6 space 606 accessible at the monitor level, are mapped to the R0 space 610 starting with the physical address 0x80000000 and ending with the physical address 0x9FFFFFFF. The first pseudo data coherence management request signal is not activated for addresses in this M6 space 606. Logical addresses 0xE0000000 to 0xFFFFFFFF, which form an M7 space 607 accessible at the monitor level, are mapped to the R1 space 611 starting with the physical address 0xA0000000 and ending with the physical address 0xBFFFFFFF. The first pseudo data coherence management request signal is not activated for addresses in this M7 space 607.

Figure 7:
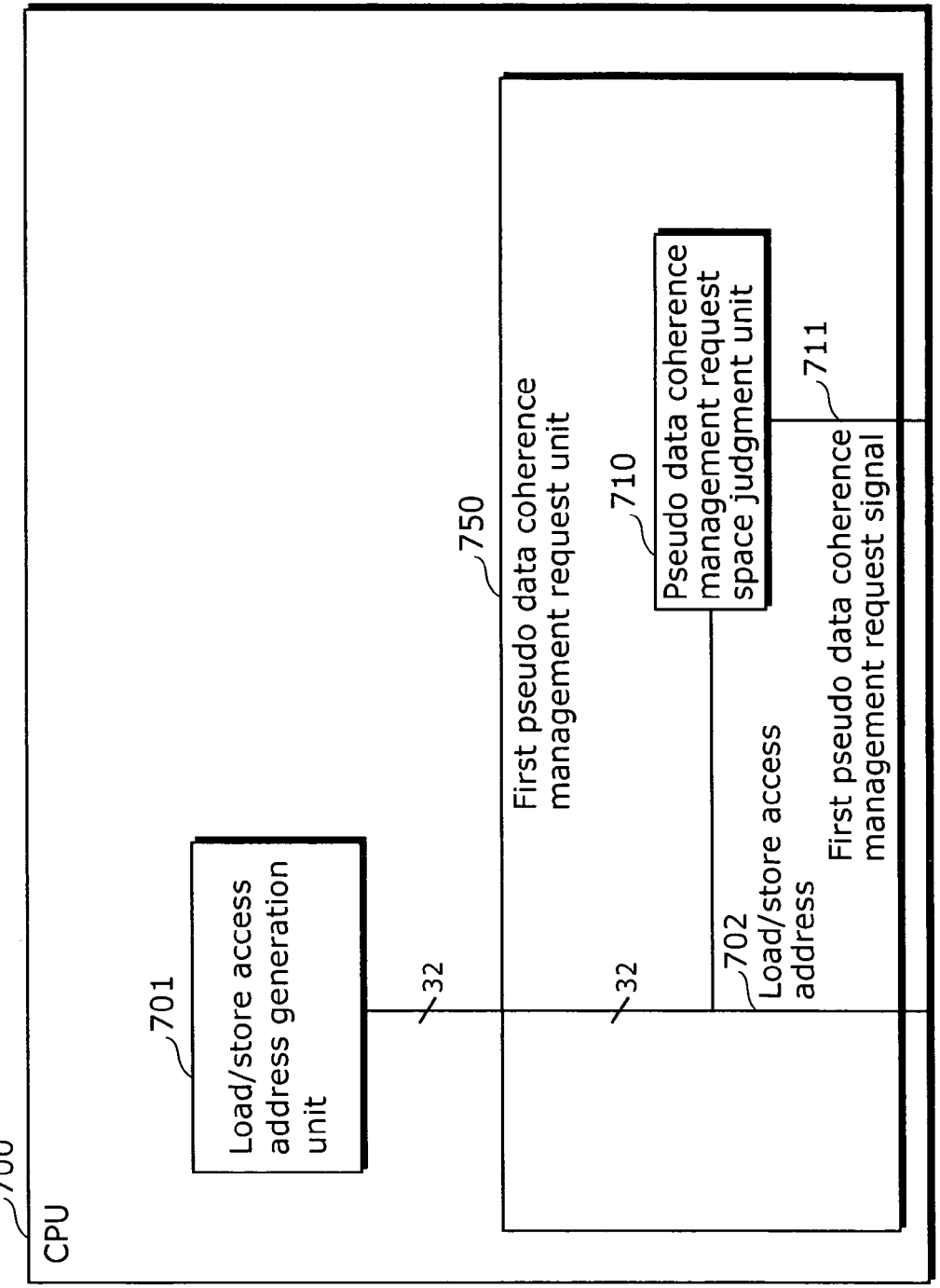
FIG. 7 is a diagram showing another structure of the first pseudo data coherence management request unit.

FIG. 7 is a diagram showing the structure of each of the first pseudo data coherence management request units 381 and 382 shown in FIG. 3. FIG. 7 depicts functional blocks related to each of the first pseudo data coherence management request units 381 and 382 in the respective CPUs 311 and 312 shown in FIG. 3. Each CPU 700 includes: a load/store access address generation unit 701 that generates a load/store access address 702 when a load/store access is performed; and a first pseudo data coherence management request unit 750 having a pseudo data coherence management request space judgment unit (hereinafter also referred to simply as "space judgment unit") 710 that judges whether or not to activate a first pseudo data coherence management request signal (hereinafter also referred to simply as "first request signal") 711, under the mapping rules shown in FIG. 6, depending on a load/store address at the time of load/store instruction execution. The load/store access address 702 and the first request signal 711 generated here are respectively outputted to each of the local caches shown in FIG. 3 and then to the shared bus control unit 370.

Figure 8:
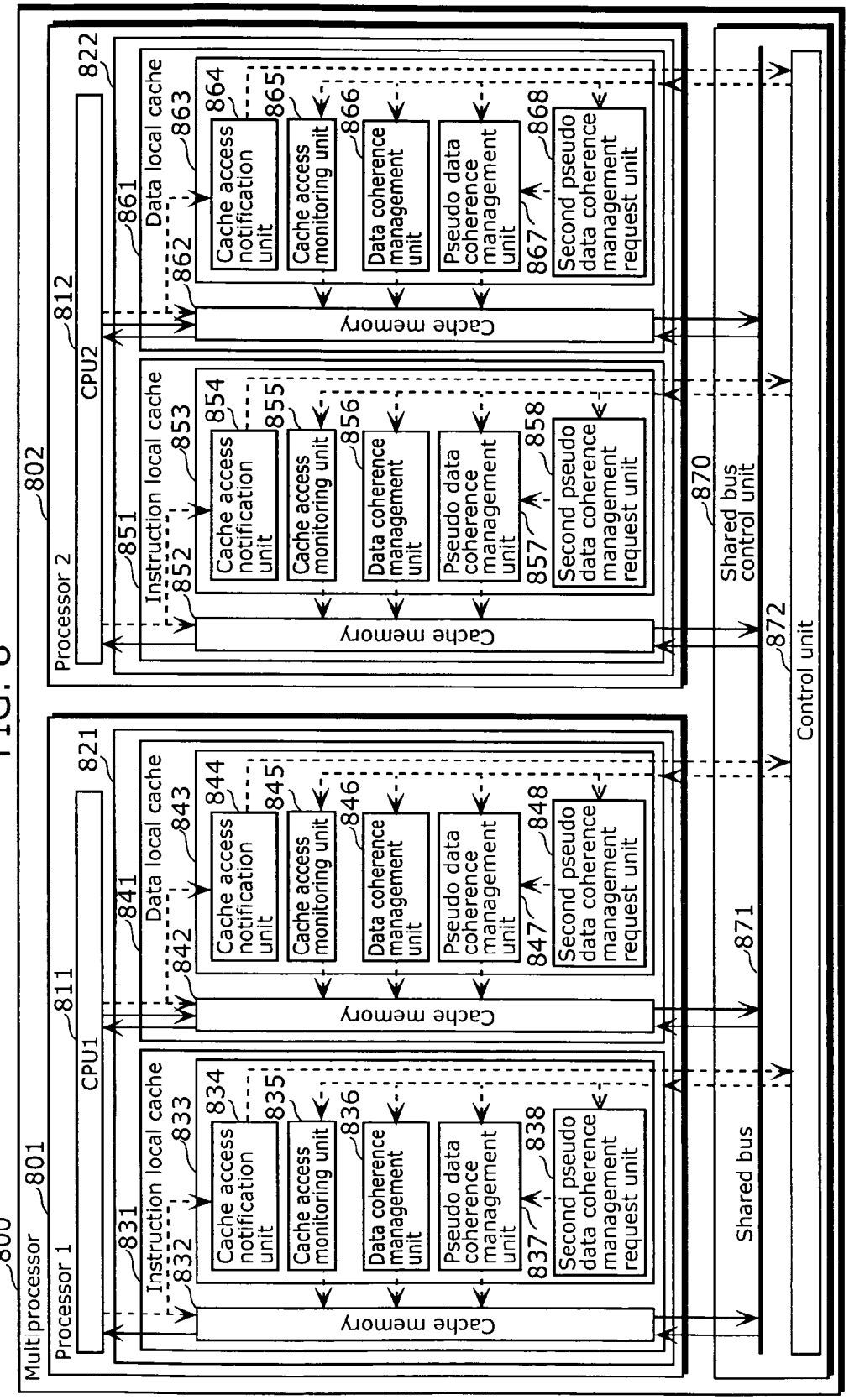
FIG. 8 is a functional block diagram showing another architecture of the multiprocessor according to the present invention.

FIG. 8 is a functional block diagram showing the multiprocessor according to the present embodiment. In the multiprocessor of the present embodiment, a CPU 811 further includes second pseudo data coherence management request units 838 and 848, and a CPU 812 further includes second pseudo data coherence management request units 858 and 868, in addition to the constituent elements of the multiprocessor shown in FIG. 1. The second pseudo data coherence management request units 838, 848, 858, and 868 are connected to the shared bus control unit 870, via which the second pseudo data coherence management request units 838, 848, 858, and 868 are connected to the pseudo data coherence management units 836, 846, 856, and 866 of the respective local caches, as in the case of the cache access notification units 834, 844, 854, and 864.

The pseudo data coherence management units 837, 847, 857, and 867 launch an operation to read data from the external memory to refill their respective local caches by operating as if the cache memories of their respective local caches already stored the same data as the data accessed by another local cache only in the case of detecting that a second pseudo data coherence management request signal (hereinafter also referred to simply as "second request signal") outputted from the second pseudo data coherence management request unit 838, 848, 858, or 868 is active.

Figure 9:
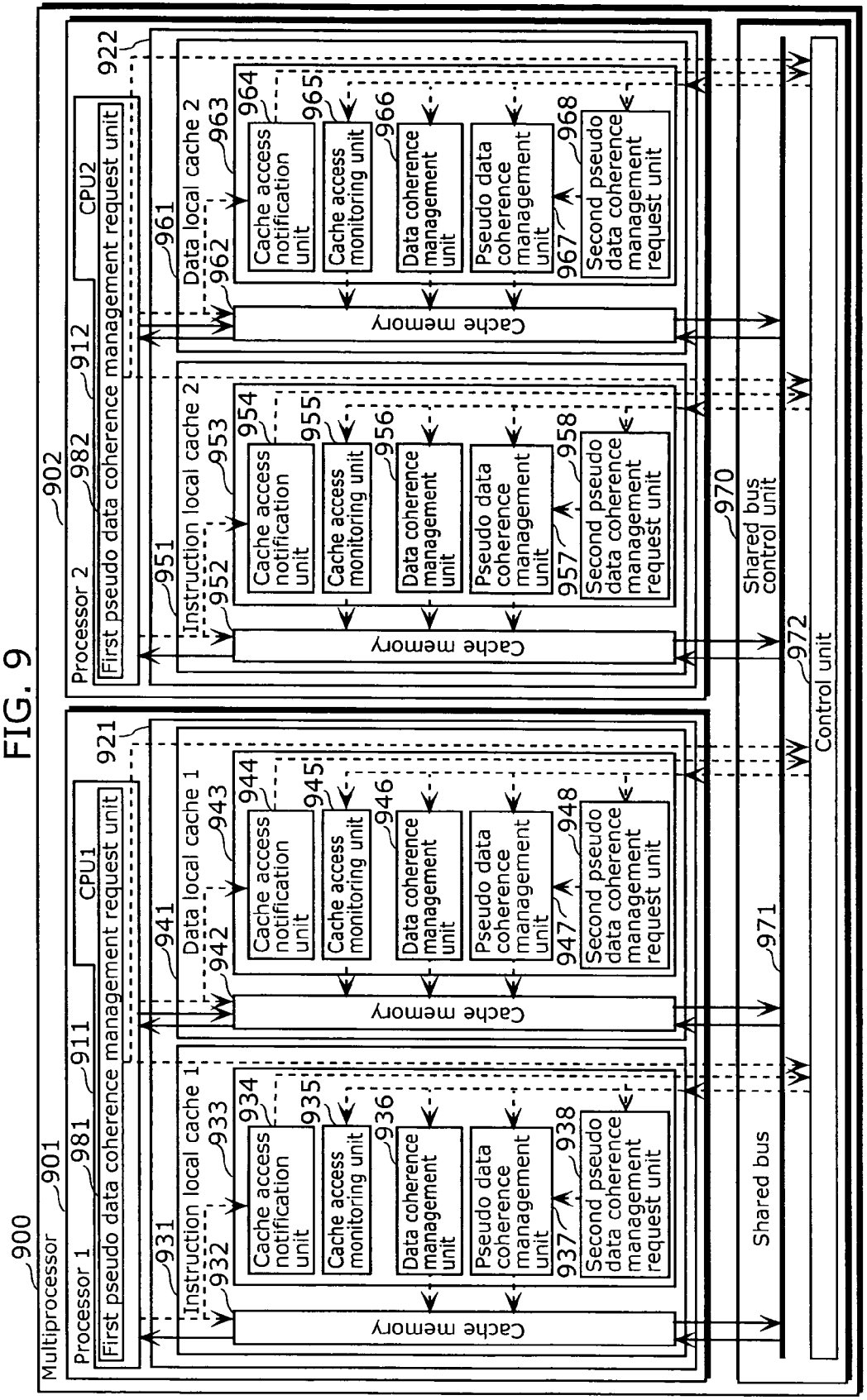
FIG. 9 is a functional block diagram showing another architecture of the multiprocessor according to the present invention.

FIG. 9 is a functional block diagram showing another multiprocessor according to the present embodiment. In this another multiprocessor of the present embodiment, a CPU 911 further includes second pseudo data coherence management request units 938 and 948, and a CPU 912 further includes second pseudo data coherence management request units 958 and 968, in addition to the constituent elements of the multiprocessor shown in FIG. 3. The second pseudo data coherence management request units 938, 948, 958, and 968 are connected to the shared bus control unit 970, via which the second pseudo data coherence management request units 938, 948, 958, and 968 are connected to the pseudo data coherence management units 937, 947, 957, and 967 of the respective local caches, as in the case of the cache access notification units 934, 944, 954, and 964.

The pseudo data coherence management units 937, 947, 957, and 967 launch an operation to read data from the external memory to refill their respective local caches by operating as if the cache memories of their respective local caches already stored the same data as the data accessed by another local cache only in one of the following cases: detecting that a first pseudo data coherence management request signal (hereinafter also referred to simply as "first request signal") notified by the first pseudo data coherence management request unit 981 or 982 is active; and a second pseudo data coherence management request signal (hereinafter also referred to simply as "second request signal") outputted from the second pseudo data coherence management request unit 938, 948, 958, or 968 is active.

FIG. 15C is a diagram showing the program 3 according to the third embodiment. In FIG. 15C, instructions executed by the processor 301 and instructions executed by the processor 302 are illustrated side by side.

The program 3 is different from the program 2 shown in FIG. 15B in the following points: an address in the SU2 space 602 shown in FIG. 6 is set as an address of a load/store instruction for which the operations of the pseudo data coherence management units are wished to be enabled; and an address in the S4 space 604 shown in FIG. 6 is set as an address of a load/store instruction for which the operations of the pseudo data coherence management units are not required to be enabled.

Note that the setting of spaces for which the first pseudo data coherence management request signal is activated is not limited to an example shown in FIG. 6. It is therefore possible to set, within the same physical address space, spaces on a page-by-page basis for which the first pseudo data coherence management request signal is activated.

Referring to FIG. 2C, FIG. 3, FIG. 6, FIG. 7, FIG. 8, and FIG. 15C showing the program 3, the following describes a fifth multiprocessor that uses the first pseudo data coherence management request units having the pseudo data coherence management request space judgment units in the multiprocessor architecture.

In the fifth multiprocessor, the processor 301 executes a register transfer instruction (1) and the processor 302 executes a clear instruction (6) respectively in T1 shown in FIG. 2C. The instruction (1) is an instruction for storing address 0x40000000 into the register A0, and the instruction (6) is an instruction for clearing the register D0 (setting the value of the register D0 to zero).

In the fifth multiprocessor, the processor 301 executes a load instruction (2) and the processor 302 executes a register transfer instruction (7) respectively in T2 shown in FIG. 2C. The instruction (2) is an instruction for reading (loading) the data onto the register D0 from a location specified by the address indicated by the register A0, and the instruction (7) is an instruction for storing address 0x40000104 into the register A0. As shown in FIG. 7, the CPU 700 (811 in FIG. 8)

includes the load/store access address generation unit 701 that generates a load/store access address and the first pseudo data coherence management request unit 750 that activates the first pseudo data coherence management request signal, and the first pseudo data coherence management request unit 750 includes the pseudo data coherence management request space judgment unit 710. This space judgment unit 710 detects that the instruction (2) corresponds to an address for which the first request signal should be activated, by monitoring the load/store access address, and notifies this detection to the shared bus control unit 870. The cache access notification unit of the processor 301 notifies the shared bus control unit 870 of the fact that a cache miss of a cacheable read access has occurred. The cache access monitoring unit of the processor 302 searches the cache memory using, as a key, the same access details as those used by the processor 301 in response to the notification sent via the shared bus control unit 870. The data coherence management unit of the processor 302 does not perform a cache-to-cache data transfer since it is a snoopy cache miss access. In order to receive an active first pseudo data coherence management request signal from the shared bus control unit 870, the pseudo data coherence management unit of the processor 302 issues, to the shared bus control unit 870, an external memory read request for performing a cache refill access. As a result, the cache memories of the respective processors 301 and 302 are refilled. The shared bus control unit 870 is not required to wait for any cycles for a shared bus access since the shared bus 871 is not in use. Thus, the number of instruction execution cycles is seven cycles, from T2 to T8, and the shared bus 871 is to be occupied from T8 to T11 due to the cache refill access performed in response to the instruction (2).

In the fifth multiprocessor, while the processor 301 is executing the load instruction (2) in T3 shown in FIG. 2C, the processor 302 executes a load instruction (8). The instruction (8) is an instruction for reading (loading) the data onto the register D0 from a location specified by the address indicated by the register A0. As shown in FIG. 7, the CPU 700 (812 in FIG. 8) includes the load/store access address generation unit 701 that generates a load/store access address and the first pseudo data coherence management request unit 750 that activates the first pseudo data coherence management request signal, and the first pseudo data coherence management request unit 750 includes the pseudo data coherence management request space judgment unit 710. This space judgment unit 710 detects that the instruction (8) corresponds to an address for which the first request signal should be activated, by monitoring the load/store access address, and notifies the result of this notification to the shared bus control unit 870. The cache access notification unit of the processor 302 notifies the shared bus control unit 870 of the fact that a cache miss of a cacheable read access has occurred. The cache access monitoring unit of the processor 301 searches the cache memory using, as a key, the same access details as those used by the processor 302 in response to the notification sent via the shared bus control unit 870. The data coherence management unit of the processor 301 does not perform a cache-to-cache data transfer since it is a snoopy cache miss access. In order to receive an active first pseudo data coherence management request signal from the shared bus control unit 870, the pseudo data coherence management unit of the processor 301 issues, to the shared bus control unit 870, an external memory read request for performing a cache refill access. As a result, the cache memories of the respective processors 301 and 302 are refilled. The shared bus control unit 870 is required to wait for some cycles until it can perform a shared bus access since the shared bus 871 is in use. Thus, the number of instruction execution cycles is ten cycles, from T3 to T12, and the shared bus 871 is to be occupied from T12 to T15 due to the cache refill access performed in response to the instruction (8).

In the fifth multiprocessor, the processor 301 executes an add instruction (3) in T9 shown in FIG. 2C, while the processor 302 is executing the load instruction (8). The instruction (3) is an instruction for adding an immediate value 0x05 and the value in the register D0, and storing the addition result into the register D0.

In the fifth multiprocessor, the processor 301 executes a register transfer instruction (4) in T10 shown in FIG. 2C, while the processor 302 is executing the load instruction (8). The instruction (4) is an instruction for storing address 0x80000100 into the register A1.

In the fifth multiprocessor, the processor 301 executes a store instruction (5) and the processor 302 executes a register transfer instruction (9) respectively in T11 shown in FIG. 2C. The instruction (5) is an instruction for writing (storing) the contents of the register D0 into a memory indicated by the register A1. The cache access notification unit of the processor 301 notifies the shared bus control unit 870 of the fact that a cache miss of a cacheable write access has occurred as a result of the access performed in response to the instruction (5). The cache access monitoring unit of the processor 302 searches the cache memory using, as a key, the same access details as those used by the processor 301 in response to the notification sent via the shared bus control unit 870. The data coherence management unit of the processor 302 performs a cache-to-cache data transfer, and then invalidates the entry of such data since it is a snoopy cache hit access. The shared bus control unit 870 is required to wait for some cycles until it can perform a shared bus access since the shared bus 871 is in use. Thus, the number of instruction execution cycles is six cycles, from T11 to T16, and the shared bus 871 is to be occupied from T16 to T19 due to the cache refill access performed in response to the instruction (5).

In the fifth multiprocessor, while the processor 301 is executing the store instruction (5) in T13 shown in FIG. 2C, the processor 302 is executing the data transfer instruction (9). The instruction (9) is an instruction for storing address 0x40000004 into the register A1.

In the fifth multiprocessor, while the processor 301 is executing the store instruction (5) in T14 shown in FIG. 2C, the processor 302 executes a load instruction (10). The instruction (10) is an instruction for reading (loading) the data onto the register D1 from a location specified by the address indicated by the register A1. The access that is performed in response to the instruction (10) is a cache hit of a cacheable read access since the pseudo data coherence management unit of the processor 302 issues a refill request to the cache memory in response to the instruction (2) executed in T2 shown in FIG. 2C. Thus, the number of instruction execution cycles is one cycle in T14.

In the fifth multiprocessor, the processor 302 executes an add instruction (11) in T15 shown in FIG. 2C. The instruction (11) is an instruction for adding the values in the register D1 and the register D0, and storing the addition result into the register D0.

In the fifth multiprocessor, the processor 302 executes a store instruction (12) in T16 shown in FIG. 2C. The instruction (12) is an instruction for writing (storing) the contents of the register D0 into a memory indicated by the register A0. The cache access notification unit of the processor 302 notifies the shared bus control unit 870 of the fact that a cache miss of a cacheable write access has occurred as a result of the access performed in response to the instruction (12). The cache access monitoring unit of the processor 301 searches the cache memory using, as a key, the same access details as those used by the processor 302 in response to the notification sent via the shared bus control unit 870. The data coherence management unit of the processor 301 performs a cache-to-cache data transfer, and then invalidates the entry of such data since it is a snoopy cache hit access. The shared bus control unit 870 is required to wait for some cycles until it can perform a shared bus access since the shared bus 871 is in use. Thus, the number of instruction execution cycles is five cycles, from T16 to T20, and the shared bus 871 is to be occupied from T20 to T23 due to the cache write access performed in response to the instruction (12).

As described above, 20 cycles are required in the case of executing the program 3 in the fifth multiprocessor architecture. What is more, it is possible to prevent unnecessary sharing of data attributable to the pseudo data coherence management units intended for preventing the decrease in cache locality, without adding any instruction sets, since it is ensured that the operations of such pseudo data coherence management units are not enabled depending on a judgment of the pseudo data coherence management request space judgment units.

By additionally including the pseudo data coherence management request units having the pseudo data coherence management request space judgment units that judge whether or not to enable the operations of the pseudo data coherence management units depending on a space of a logical address specified by a load/store instruction and by enabling the operations of the pseudo data coherence management units only at the time of load/store instruction when a specific process identifier is outputted, the fourth embodiment achieves the prevention of the decrease in cache locality attributable to the pseudo data coherence management units as well as the reduction of wasteful use of cache capacity (shared use of unnecessary data) attributable to the structure of the third embodiment, without being limited to the processor status storage units.

Note that, in the fourth embodiment, the first pseudo data coherence management request units are used as units for enabling the operations of the pseudo data coherence management units, but the present invention is not limited to this structure. For example, the same effect can be produced by using the second pseudo data coherence management request units shown in FIG. 8 although a control method thereof is different from that of the first pseudo data coherence management request units. It is also possible, as shown in FIG. 9, to use both the first pseudo data coherence management request units and second pseudo data coherence management request units whose pseudo data coherence management request space judgment units are respectively different.

Note that the fourth embodiment describes only cache-to-cache data transfer carried out between the data local caches for the purpose of simplifying illustrations, but the present invention is not limited to this structure.

Fifth Embodiment

However, since the settings of the pseudo data coherence management units by use of the pseudo data coherence management request space judgment units are different depending on the contents of each user program and privilege level such as a supervisor level, it is difficult to create a program under the unified rules. It is deemed, therefore, that reduction in wasteful use of cache capacity cannot be made sufficiently only by controlling the pseudo data coherence management units by use of the pseudo data coherence management request space judgment units of the fourth embodiment. In view of this, referring to FIG. 2C, FIG. 3, FIG. 8, FIG. 9, FIG. 10, and FIG. 15C showing the program 3, a description is given of a multiprocessor that reduces wasteful use of cache capacity (shared use of unnecessary data) without adding any special instruction codes, by being equipped with units that judge whether or not to enable the operations of the pseudo data coherence management units according to a logical address specified by a load/store instruction.

Figure 10:
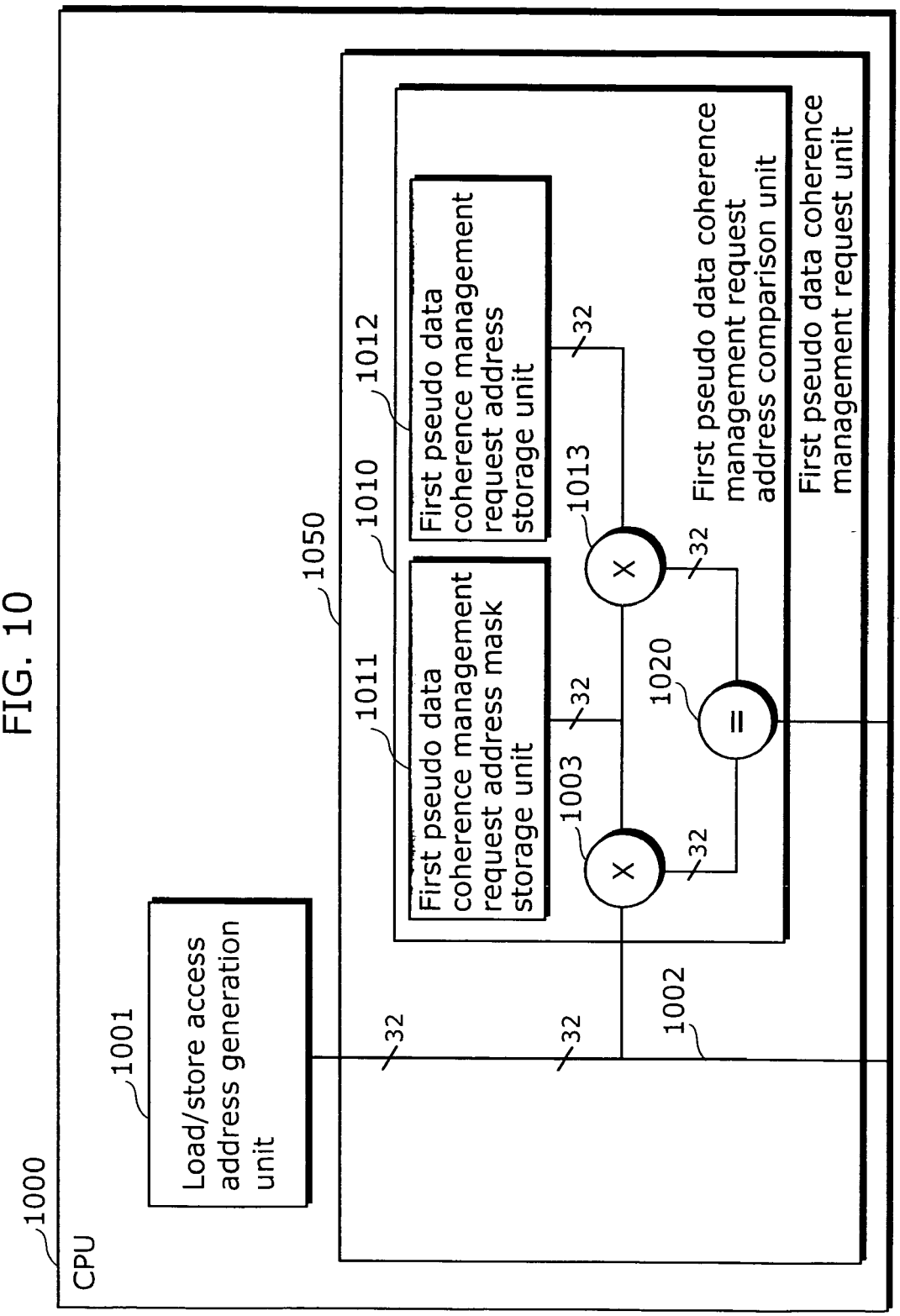
FIG. 10 is a diagram showing a structure of each of a first pseudo data coherence management request unit and a second pseudo data coherence management request unit according to a fifth embodiment.

FIG. 10 is a diagram showing the structure of each of the first pseudo data coherence management request units shown in FIG. 3 and FIG. 9. FIG. 10 depicts functional blocks related to each of the first pseudo data coherence management request units in the respective CPUs shown in FIG. 3 and FIG. 9. Note that FIG. 10 also shows the structure of each of the second pseudo data coherence management request units shown in FIG. 8 and FIG. 9, and that FIG. 10 depicts functional blocks related to each of the second pseudo data coherence management request units in the respective CPUs shown in FIG. 8 and FIG. 9. The following description is given based on the first pseudo data coherence management units. Each CPU 1000 includes a load/store access address generation unit 1001 that generates a load/store access address 1002 when a load/store access is performed and a first pseudo data coherence management request unit 1050. This first pseudo data coherence management request unit 1050 includes a first pseudo data coherence management request address comparison unit (hereinafter also referred to simply as "address comparison unit") 1010 having: a first pseudo data coherence management request address storage unit (hereinafter also referred to simply as "address storage unit") 1012 for detecting whether a load/store address 1002 at the time of load/store instruction execution is an address for which the first pseudo data coherence management request signal (hereinafter also refereed to simply as "first request signal") should be activated; and a first pseudo data coherence management request address mask storage unit (hereinafter also referred simply as "mask storage unit") 1011. The load/store access address 1002 and the first pseudo data coherence management request signal generated here are respectively outputted to each of the local caches shown in FIG. 3 and then to the shared bus control unit 370. The first request signal shown in FIG. 10 is activated in the case where two logical products match as a result of comparison, one being that of the load/store address 1002 and an address mask stored by the address mask storage unit 1011, and the other being that of an access base address stored by the address storage unit 1012 and said address mask.

Referring to FIG. 2C, FIG. 3, FIG. 8, FIG. 9, FIG. 10, and FIG. 15C showing the program 3, the following describes a sixth multiprocessor that uses the first pseudo data coherence management request units having the first pseudo data coherence management request address comparison units in the multiprocessor architecture.

Note that in the fifth embodiment, 0x40000000 is set to the address storage units shown in FIG. 9 and 0xFFFF0000 is set to the address mask storage units shown in FIG. 9 at the beginning of program execution, but the present invention is not limited to this setting method.

In the sixth multiprocessor, the processor 301 executes a register transfer instruction (1) and the processor 302 executes a clear instruction (6) respectively in T1 shown in FIG. 2C. The instruction (1) is an instruction for storing address 0x40000000 into the register A0, and the instruction (6) is an instruction for clearing the register D0 (setting the value of the register D0 to zero).

In the sixth multiprocessor, the processor 301 executes a load instruction (2) and the processor 302 executes a register transfer instruction (7) respectively in T2 shown in FIG. 2C. The instruction (2) is an instruction for reading (loading) the data onto the register D0 from a location specified by the address indicated by the register A0, and the instruction (7) is an instruction for storing address 0x40000104 into the register A0. As shown in FIG. 10, the CPU 1000 (911 in FIG. 9) includes the load/store access address generation unit 1001 that generates a load/store access address and the first pseudo data coherence management request unit 1050 that activates the first pseudo data coherence management request signal, and the first pseudo data coherence management request unit 1050 includes the first pseudo data coherence management request address comparison unit 1010. This address comparison unit 1010 detects that the instruction (2) corresponds to an address for which the first request signal should be activated by monitoring the load/store access address, and notifies this detection to the shared bus control unit 970. The cache access notification unit of the processor 301 notifies the shared bus control unit 970 of the fact that a cache miss of a cacheable read access has occurred. The cache access monitoring unit of the processor 302 searches the cache memory using, as a key, the same access details as those used by the processor 301 in response to the notification sent via the shared bus control unit 970. The data coherence management unit of the processor 302 does not perform a cache-to-cache data transfer since it is a snoopy cache miss access. In order to receive an active first pseudo data coherence management request signal from the shared bus control unit 970, the pseudo data coherence management unit of the processor 302 issues, to the shared bus control unit 970, an external memory read request for performing a cache refill access. As a result, the cache memories of the respective processors 301 and 302 are refilled. The shared bus control unit 970 is not required to wait for any cycles for a shared bus access since the shared bus 971 is not in use. Thus, the number of instruction execution cycles is seven cycles, from T2 to T8, and the shared bus 971 is to be occupied from T8 to T11 due to the cache refill access performed in response to the instruction (2).

In the sixth multiprocessor, while the processor 301 is executing the load instruction (2) in T3 shown in FIG. 2C, the processor 302 executes a load instruction (8). The instruction (8) is an instruction for reading (loading) the data onto the register D0 from a location specified by the address indicated by the register A0. As shown in FIG. 10, the CPU 1000 (912 in FIG. 9) includes the load/store access address generation unit 1001 that generates a load/store access address and the first pseudo data coherence management request unit 1050 that activates the first pseudo data coherence management request signal, and the first pseudo data coherence management request unit 1050 includes the first pseudo data coherence management request address comparison unit 1010. This address comparison unit 1010 detects that the instruction (8) corresponds to an address for which the first request signal should be activated by monitoring the load/store access address, and notifies this detection to the shared bus control unit 970. The cache access monitoring unit of the processor 302 searches the cache memory using, as a key, the same access details as those used by the processor 301 in response to the notification sent via the shared bus control unit 970. The data coherence management unit of the processor 301 does not perform a cache-to-cache data transfer since it is a snoopy cache miss access. In order to receive an active first pseudo data coherence management request signal from the shared bus control unit 970, the pseudo data coherence management unit of the processor 301 issues, to the shared bus control unit 970, an external memory read request for performing a cache refill access. As a result, the cache memories of the respective processors 301 and 302 are refilled. The shared bus control unit 970 is required to wait for some cycles until it can perform a shared bus access since the shared bus 971 is in use. Thus, the number of instruction execution cycles is ten cycles, from T3 to T12, and the shared bus 971 is to be occupied from T12 to T15 due to the cache refill access performed in response to the instruction (8).

In the sixth multiprocessor, the processor 301 executes an add instruction (3) in T9 shown in FIG. 2C, while the processor 302 is executing the load instruction (8). The instruction (3) is an instruction for adding an immediate value 0x05 and the value in the register D0, and storing the addition result into the register D0.

In the sixth multiprocessor, the processor 301 executes a register transfer instruction (4) in T10 shown in FIG. 2C, while the processor 302 is executing the load instruction (8). The instruction (4) is an instruction for storing address 0x80000100 into the register A1.

In the sixth multiprocessor, the processor 301 executes a store instruction (5) and the processor 302 executes a register transfer instruction (9) respectively in T11 shown in FIG. 2C. The instruction (5) is an instruction for writing (storing) the contents of the register D0 into a memory indicated by the register A1. The cache access notification unit of the processor 301 notifies the shared bus control unit 970 of the fact that a cache miss of a cacheable write access has occurred as a result of the access performed in response to the instruction (5). The cache access monitoring unit of the processor 302 searches the cache memory using, as a key, the same access details as those used by the processor 301 in response to the notification sent via the shared bus control unit 970. The data coherence management unit of the processor 302 performs a cache-to-cache data transfer, and then invalidates the entry of such data since it is a snoopy cache hit access. The shared bus control unit 970 is required to wait for some cycles until it can perform a shared bus access since the shared bus 971 is in use. Thus, the number of instruction execution cycles is six cycles, from T11 to T16, and the shared bus 971 is to be occupied from T16 to T19 due to the cache refill access performed in response to the instruction (5).

In the sixth multiprocessor, while the processor 301 is executing the store instruction (5) in T13 shown in FIG. 2C, the processor 302 is executing the data transfer instruction (9). The instruction (9) is an instruction for storing address 0x40000004 into the register A1.

In the sixth multiprocessor, while the processor 301 is executing the store instruction (5) in T14 shown in FIG. 2C, the processor 302 executes a load instruction (10). The instruction (10) is an instruction for reading (loading) the data onto the register D1 from a location specified by the address indicated by the register A1. The access that is performed in response to the instruction (10) is a cache hit of a cacheable read access since the pseudo data coherence management unit of the processor 302 issues a refill request to the cache memory in response to the instruction (2) executed in T2 shown in FIG. 2C. Thus, the number of instruction execution cycles is one cycle in T14.

In the sixth multiprocessor, the processor 302 executes an add instruction (11) in T15 shown in FIG. 2C. The instruction (11) is an instruction for adding the values in the register D1 and the register D0, and storing the addition result into the register D0.

In the sixth multiprocessor, the processor 302 executes a store instruction (12) in T16 shown in FIG. 2C. The instruction (12) is an instruction for writing (storing) the contents of the register D0 into a memory indicated by the register A0. The cache access notification unit of the processor 302 notifies the shared bus control unit 970 of the fact that a cache miss of a cacheable write access has occurred as a result of the access performed in response to the instruction (12). The cache access monitoring unit of the processor 301 searches the cache memory using, as a key, the same access details as those used by the processor 302 in response to the notification sent via the shared bus control unit 970. The data coherence management unit of the processor 301 performs a cache-to-cache data transfer, and then invalidates the entry of such data since it is a snoopy cache hit access. The shared bus control unit 970 is required to wait for some cycles until it can perform a shared bus access since the shared bus 971 is in use. Thus, the number of instruction execution cycles is five cycles, from T16 to T20, and the shared bus 971 is to be occupied from T20 to T23 due to the cache write access performed in response to the instruction (12).

As described above, 20 cycles are required in the case of executing the program 3 in the sixth multiprocessor architecture. What is more, it is possible to prevent unnecessary sharing of data attributable to the pseudo data coherence management units intended for preventing the decrease in cache locality, without adding any instruction sets, since it is ensured that the operations of such pseudo data coherence management units are not enabled depending on a result of a comparison made by the first pseudo data coherence management request address comparison.

By additionally including the first pseudo data coherence management request units having the first pseudo data coherence management request address comparison units that judge whether or not to enable the operations of the pseudo data coherence management units depending on a logical address specified by a load/store instruction, and by enabling the operations of the pseudo data coherence management units only when a load/store instruction specified by a specific logical address is executed, the fifth embodiment achieves the prevention of the decrease in cache locality attributable to the pseudo data coherence management units as well as the reduction of wasteful use of cache capacity (shared use of unnecessary data) attributable to the structure of the fourth embodiment, without being limited to the pseudo data coherence management request space judgment units.

It should be noted that, in the first pseudo data coherence management request address storage unit and first pseudo data coherence management request address mask unit of the fifth embodiment, a first pseudo data coherence management request signal is inputted to the pseudo data coherence management unit of another local cache via the shard bus control unit from the data access base address storage unit and its comparison unit of a local cache accessed by the CPU, but the present invention is not limited to this. It is therefore possible to input the first pseudo data coherence management request signal using the second pseudo data coherence management request address storage unit and second pseudo data coherence management request address mask storage unit of another local cache.

Note that the fifth embodiment describes only cache-to-cache data transfer carried out between the data local caches for the purpose of simplifying illustrations, but the present invention is not limited to this structure.

Sixth Embodiment

However, even in the same logical address space, some addresses correspond to data that are wished to be shared, while the others are not. For example, even in the case where the user level, process identifier, and address space are the same, whether data is to be shared or not depends on a page address of a program. It is deemed, therefore, that reduction in wasteful use of cache capacity cannot be made sufficiently only by controlling the pseudo data coherence management units by use of the pseudo data coherence management request space judgment units of the fourth embodiment and the first pseudo data coherence management request address comparison units of the fifth embodiment.

In view of this, referring to FIG. 2C, FIG. 3, FIG. 8, FIG. 9, FIG. 11, and FIG. 15C showing the program 3, a description is given of a multiprocessor that reduces wasteful use of cache capacity (shared use of unnecessary data) without adding any special instruction codes, by use of first pseudo data coherence management request address conversion units that includes translation look-aside buffers (TLBS) for logical address spaces to be accessed, so as to control the operations of the pseudo data coherence management units.

Figure 11:
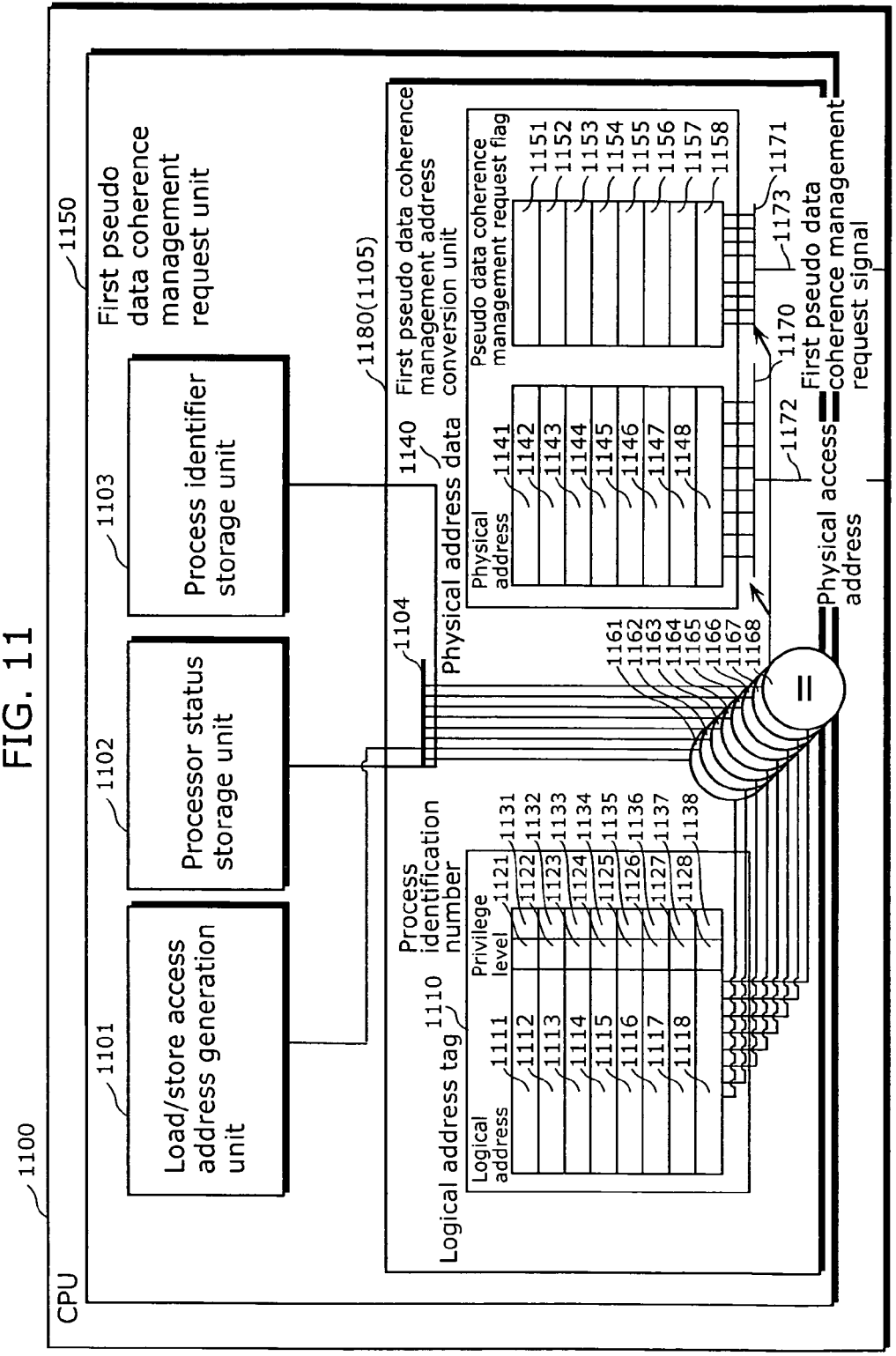
FIG. 11 is a diagram showing a structure of the first pseudo data coherence management request unit according to the fifth embodiment.

FIG. 11 is a diagram showing the structure of each of the first pseudo data coherence management request units shown in FIG. 3 and FIG. 9. FIG. 11 depicts functional blocks related to each of the first pseudo data coherence management request units in the respective CPUs shown in FIG. 3, FIG. 8, and FIG. 9. Each CPU 1100 includes a first pseudo data coherence management request unit 1150 having: a load/store access address generation unit 1101 that generates a load/store access address when a load/store access is performed; a processor status storage unit 1102 that stores the status of the processor at the time of instruction execution; a process identifier storage unit 1103 that stores a process number at the time of instruction execution; and a first pseudo data coherence management request address conversion unit 1180 (hereinafter also referred to simply as "address conversion unit 1180" and as "TLB 1105"). In addition to having the function of TLB for converting a logical address into a physical address, this address conversion unit 1180 is capable of judging whether or not such physical address (load/store address) is an address for which a first pseudo data coherence management request signal (hereinafter also referred to simply as "first request signal") 1173 should be activated. In order to be able to do this, the address conversion unit 1180 includes a logical access tag unit 1110 (TLB tag unit), a physical address data unit 1140, comparators 1161 to 1168, a distributor 1104, and selectors 1170 and 1171. Stored in the logical address tag unit 1110 are logical address tags 1111 to 1118, privilege levels 1121 to 1128, and process identifiers 1131 to 1138. Stored in the physical address unit 1140 are physical addresses 1141 to 1148 and first pseudo data coherence management request flags (hereinafter also referred to simply as "request flags") 1151 to 1158 indicating whether or not to activate a first request signal 1173. When a load/store instruction is executed, the following are inputted to the TLB 1105: a logical address from the load/store access address unit 1101; a signal indicating the privilege level from the processor status storage unit 1102; and a process number from the process identifier storage unit 1103. When the address tag unit 1110 includes an entry that match the above inputs to the TLB 1105, it is a TLB hit, and the physical access address corresponding to such entry and a request flag are outputted as a load/store access address and a first request signal 1173 to the respective local caches via the shared bus control unit 370 shown in FIG. 3.

Referring to FIG. 2C, FIG. 3, FIG. 8, FIG. 9, FIG. 11, and FIG. 15C showing the program 3, the following describes a seventh multiprocessor that uses the first pseudo data coherence management request units having the first pseudo data coherence management request address conversion units in the multiprocessor architecture.

Note that in the sixth embodiment, the following are sets to the respective address tags in the first pseudo data coherence management request address conversion unit shown in FIG. 11 at the beginning of program execution: 0x40000000 is set to the logical address tag 1111; and the physical address 0x80000000 and the pseudo data coherence management request flag 1151 are set to the physical address tag 1141. Also note that for the purpose of simplifying illustrations, the process identifier 1121 is 0, and the privilege level 1131 is set to the supervisor level. It should be appreciated that the present invention is not limited to this setting method.

In the seventh multiprocessor, the processor 301 executes a register transfer instruction (1) and the processor 302 executes a clear instruction (6) respectively in T1 shown in FIG. 2C. The instruction (1) is an instruction for storing address 0x40000000 into the register A0, and the instruction (6) is an instruction for clearing the register D0 (setting the value of the register D0 to zero).

In the seventh multiprocessor, the processor 301 executes a load instruction (2) and the processor 302 executes a register transfer instruction (7) respectively in T2 shown in FIG. 2C. The instruction (2) is an instruction for reading (loading) the data onto the register D0 from a location specified by the address indicated by the register A0, and the instruction (7) is an instruction for storing address 0x40000114 into the register A0. As shown in FIG. 11, the CPU 1100 (911 in FIG. 9) includes the load/store access address generation unit 1101 that generates a load/store access address and the first pseudo data coherence management request unit 1150 that activates the first pseudo data coherence management request signal, and the first pseudo data coherence management request unit 1150 includes the first pseudo data coherence management request address conversion unit 1180. This address conversion unit 1180 detects that the instruction (2) is an instruction for which the first request signal should be activated by monitoring the load/store access address, and notifies this detection to the shared bus control unit 970. The cache access notification unit of the processor 301 notifies the shared bus control unit 970 of the fact that a cache miss of a cacheable read access has occurred. The cache access monitoring unit of the processor 302 searches the cache memory using, as a key, the same access details as those used by the processor 301 in response to the notification sent via the shared bus control unit 970. The data coherence management unit of the processor 302 does not perform a cache-to-cache data transfer since it is a snoopy cache miss access. In order to receive an active first pseudo data coherence management request signal from the shared bus control unit 970, the pseudo data coherence management unit of the processor 302 issues, to the shared bus control unit 970, an external memory read request for performing a cache refill access. As a result, the cache memories of the respective processors 301 and 302 are refilled. The shared bus control unit 970 is not required to wait for any cycles for a shared bus access since the shared bus 971 is not in use. Thus, the number of instruction execution cycles is seven cycles, from T2 to T8, and the shared bus 971 is to be occupied from T8 to T11 due to the cache refill access performed in response to the instruction (2).

In the seventh multiprocessor, while the processor 301 is executing the load instruction (2) in T3 shown in FIG. 2C, the processor 302 executes a load instruction (8). The instruction (8) is an instruction for reading (loading) the data onto the register D0 from a location specified by the address indicated by the register A0. As shown in FIG. 11, the CPU 1100 (912 in FIG. 9) includes the load/store access address generation unit 1101 that generates a load/store access address and the first pseudo data coherence management request unit 1150 that activates the first pseudo data coherence management request signal, and the first pseudo data coherence management request unit 1150 includes the first pseudo data coherence management request address conversion unit 1180. This address conversion unit 1180 detects that the instruction (8) is an instruction for which the first request signal should be activated by monitoring the load/store access address, and notifies this detection to the shared bus control unit 970. The cache access monitoring unit of the processor 301 searches the cache memory using, as a key, the same access details as those used by the processor 302 in response to the notification sent via the shared bus control unit 970. The data coherence management unit of the processor 301 does not perform a cache-to-cache data transfer since it is a snoopy cache miss access. In order to receive an active first pseudo data coherence management request signal from the shared bus control unit 970, the pseudo data coherence management unit of the processor 301 issues, to the shared bus control unit 970, an external memory read request for performing a cache refill access. As a result, the cache memories of the respective processors 301 and 302 are refilled. The shared bus control unit 970 is required to wait for some cycles until it can perform a shared bus access since the shared bus 971 is in use. Thus, the number of instruction execution cycles is ten cycles, from T3 to T12, and the shared bus 971 is to be occupied from T12 to T15 due to the cache refill access performed in response to the instruction (8).

In the seventh multiprocessor, the processor 301 executes an add instruction (3) in T9 shown in FIG. 2C, while the processor 302 is executing the load instruction (8). The instruction (3) is an instruction for adding an immediate value 0x05 and the value in the register D0, and storing the addition result into the register D0.

In the seventh multiprocessor, the processor 301 executes a register transfer instruction (4) in T10 shown in FIG. 2C, while the processor 302 is executing the load instruction (8). The instruction (4) is an instruction for storing address 0x80000100 into the register A1.

In the seventh multiprocessor, the processor 301 executes a store instruction (5) and the processor 302 executes a register transfer instruction (9) respectively in T11 shown in FIG. 2C. The instruction (5) is an instruction for writing (storing) the contents of the register D0 into a memory indicated by the register A1. The cache access notification unit of the processor 301 notifies the shared bus control unit 970 of the fact that a cache miss of a cacheable write access has occurred as a result of the access performed in response to the instruction (5). The cache access monitoring unit of the processor 302 searches the cache memory using, as a key, the same access details as those used by the processor 301 in response to the notification sent via the shared bus control unit 970. The data coherence management unit of the processor 302 performs a cache-to-cache data transfer, and then invalidates the entry of such data since it is a snoopy cache hit access. The shared bus control unit 970 is required to wait for some cycles until it can perform a shared bus access since the shared bus 971 is in use. Thus, the number of instruction execution cycles is six cycles, from T11 to T16, and the shared bus 971 is to be occupied from T16 to T19 due to the cache refill access performed in response to the instruction (5).

In the seventh multiprocessor, while the processor 301 is executing the store instruction (5) in T13 shown in FIG. 2C, the processor 302 is executing the data transfer instruction (9). The instruction (9) is an instruction for storing address 0x40000004 into the register A1.

In the seventh multiprocessor, while the processor 301 is executing the store instruction (5) in T14 shown in FIG. 2C, the processor 302 executes a load instruction (10). The instruction (10) is an instruction for reading (loading) the data onto the register D1 from a location specified by the address indicated by the register A1. The access that is performed in response to the instruction (10) is a cache hit of a cacheable read access since the pseudo data coherence management unit of the processor 302 issues a refill request to the cache memory in response to the instruction (2) executed in T2 shown in FIG. 2C. Thus, the number of instruction execution cycles is one cycle in T14.

In the seventh multiprocessor, the processor 302 executes an add instruction (11) in T15 shown in FIG. 2C. The instruction (11) is an instruction for adding the values in the register D1 and the register D0, and storing the addition result into the register D0.

In the seventh multiprocessor, the processor 302 executes a store instruction (12) in T16 shown in FIG. 2C. The instruction (12) is an instruction for writing (storing) the contents of the register D0 into a memory indicated by the register A0. The cache access notification unit of the processor 302 notifies the shared bus control unit 970 of the fact that a cache miss of a cacheable write access has occurred as a result of the access performed in response to the instruction (12). The cache access monitoring unit of the processor 301 searches the cache memory using, as a key, the same access details as those used by the processor 302 in response to the notification sent via the shared bus control unit 970. The data coherence management unit of the processor 301 performs a cache-to-cache data transfer, and then invalidates the entry of such data since it is a snoopy cache hit access. The shared bus control unit 970 is required to wait for some cycles until it can perform a shared bus access since the shared bus 971 is in use. Thus, the number of instruction execution cycles is five cycles, from T16 to T20, and the shared bus 971 is to be occupied from T20 to T23 due to the cache write access performed in response to the instruction (12).

As described above, 20 cycles are required in the case of executing the program 3 in the seventh multiprocessor architecture. What is more, it is possible to prevent unnecessary sharing of data attributable to the pseudo data coherence management units intended for preventing the decrease in cache locality, without adding any instruction sets, since it is ensured that the operations of such pseudo data coherence management units are not enabled depending on a request flag stored in the first pseudo data coherence management request address conversion units.

By additionally including the first pseudo data coherence management request address conversion units (TLBs) that convert, into a physical address, a logical address accessed at the time of load/store instruction execution and that enable the operations of the pseudo data coherence management units depending on a pseudo data coherence management request flag stored therein, the sixth embodiment achieves the prevention of the decrease in cache locality attributable to the pseudo data coherence management units as well as the reduction of wasteful use of cache capacity (shared use of unnecessary data) attributable to the structures of the fourth embodiment and fifth embodiment, without being limited to any of the privilege levels, process identifier or logical address space to be accessed.

Note that in the TLB 1105 of the sixth embodiment, the logical address tag unit includes process identifiers and privilege levels to be compared, but the present invention is not limited to this. It is therefore possible, for example, to add, to each logical address tag, a global bit for invalidating a process identifier.

Note that the sixth embodiment describes only cache-to-cache data transfer carried out between the data local caches for the purpose of simplifying illustrations, but the present invention is not limited to this structure.

Seventh Embodiment

As described in the fifth embodiment and sixth embodiment, the first pseudo data coherence management request address comparison units and the first pseudo data coherence management request address conversion units (TLB) enable the control of whether or not to share data on a page basis and on a process basis. However, while real-time processing is highly required for some of the programs, real-time processing is not very important for the other programs. In such case, reduction in wasteful use of cache capacity cannot be made sufficiently only by the methods, presented in the first to sixth embodiments, for controlling the pseudo data coherence management units. In view of this, referring to FIG. 4, FIG. 5, FIG. 7, FIG. 10, and FIG. 11, a description is given of a multiprocessor that controls the operations of the pseudo data coherence management units by newly including a pseudo data coherence management share judgment unit. This pseudo data coherence management share judgment unit not only judges whether or not another local cache should be refilled with data but also judges whether or not such refilled data should be stored into the cache memory of the own local data cache connected to the CPU that has issued a load/store instruction. The pseudo data coherence management unit controls the operation of the own local cache depending on the result of such judgment. This is achieved without causing unnecessary cache replacement in the own local cache, while improving the above-described methods for reducing wasteful use of cache capacity (shared use of unnecessary data).

The following description assumes that the pseudo data coherence management request unit 420 shown in FIG. 4 also has the function of the above-described pseudo data coherence management share judgment unit. Similarly, the pseudo data coherence management request mode detection unit 520 shown in FIG. 5, the pseudo data coherence management request space judgment unit 710 shown in FIG. 7, the first pseudo data coherence management request address comparison unit 1010 shown in FIG. 10, and the first pseudo data coherence management request address conversion unit 1180 shown in FIG. 11, also have the function of the above-described pseudo data coherence management share judgment unit, respectively.

FIG. 4 depicts functional blocks related to each of the above-described first pseudo data coherence management request units. Each CPU 400 includes: a load/store access address generation unit 401 that generates a load/store access address 402 when a load/store access is performed; an instruction decoder 410 that decodes an instruction; and a first pseudo data coherence management request unit 450 having a pseudo data coherence management request instruction detection unit (hereinafter also referred to simply as "instruction detection unit") 420 that generates a first pseudo data coherence management request signal (hereinafter also referred to simply as "first request signal") 421 based on an output from the instruction decoder 410. The load/store access address 402 and the first request signal 421 generated here are respectively outputted to each of the local caches shown in FIG. 3 and then to the shared bus control unit 370.

Here, the instruction detection unit 420 outputs, depending on instruction, the first request signal 421 indicating whether or not to enable the operation of the pseudo data coherence management unit as well as a signal to determine whether or not to store the data into the local cache of the processor 101.

FIG. 5 depicts functional blocks related to the above-described first pseudo data coherence management request units. Each CPU 500 includes: a load/store access address generation unit 501 that generates a load/store access address 502 when a load/store access is performed; a processor status storage unit 510 that indicates a status of the processor at instruction execution time; and a first pseudo data coherence management request unit 550 having a pseudo data coherence management request mode detection unit (hereinafter also referred to simply as "mode detection unit") 520 that generates a first pseudo data coherence management request mode signal (hereinafter also referred to simply as "mode signal") 521, based on an output from the processor status storage unit 510. The load/store access address 502 and the mode signal 521 generated here are respectively outputted to each of the local caches shown in FIG. 3 and then to the shared bus control unit 370. Here, the mode detection unit 520 outputs, depending on an output from the processor status storage unit 510, the mode signal 521 indicating whether or not to enable the operation of the pseudo data coherence management unit as well as a signal to determine whether or not to store the data into the local cache of the processor 101.

FIG. 7 depicts functional blocks related to the above-described first pseudo data coherence management request units. Each CPU 700 includes: a load/store access address generation unit 701 that generates a load/store access address 702 when a load/store access is performed; and a first pseudo data coherence management request unit 750 having a pseudo data coherence management request space judgment unit (hereinafter also referred to simply as "space judgment unit") 710 that judges whether or not to activate a first pseudo data coherence management request signal (hereinafter also referred to simply as "first request signal") 711, under the mapping rules shown in FIG. 6, depending on a load/store address at the time of load/store instruction execution. The load/store access address 702 and the first request signal 711 generated here are respectively outputted to each of the local caches shown in FIG. 3 and then to the shared bus control unit 370. Here, the space judgment unit 710 outputs, according to the mapping rules shown in FIG. 6, the request signal 711 indicating whether or not to enable the operation of the pseudo data coherence management unit as well as a signal to determine whether to store the data into the local cache of the processor 101.

FIG. 10 depicts functional blocks related to the above-described first pseudo data coherence management request units. Each CPU 1000 includes: a load/store access address generation unit 1001 that generates a load/store access address 1002 when a load/store access is performed; and a first pseudo data coherence management request unit 1050. This first pseudo data coherence management request unit 1050 includes a first pseudo data coherence management request address comparison unit (hereinafter also referred to simply as "address comparison unit") 1010 having: a first pseudo data coherence management request address storage unit (hereinafter also referred to simply as "address storage unit") 1012 for detecting whether a load/store address 1002 at the time of load/store instruction execution is an address for which the first pseudo data coherence management request signal (hereinafter also refereed to simply as "first request signal") 1050 should be activated; and a first pseudo data coherence management request address mask storage unit (hereinafter also referred simply as "mask storage unit") 1011. The load/store access address 1002 and the first request signal generated here are respectively outputted to each of the local caches shown in FIG. 3 and then to the shared bus control unit 370. The address comparison unit 1010 outputs the request signal 1050 indicating whether or not to enable the operation of the pseudo data coherence management unit as well as a signal to determine whether to store the data into the local cache of the processor 101, in the case where two logical products match as a result of comparison, one being that of the load/store address 1002 and an address mask stored by the address mask storage unit 1011, and the other being that of an access base address stored by the address storage unit 1012 and said address mask.

FIG. 11 depicts functional blocks related to the above-described first pseudo data coherence management request units. Each CPU 1100 includes a first pseudo data coherence management request unit 1150 having: a load/store access address generation unit 1101 that generates a load/store access address when a load/store access is performed; a processor status storage unit 1102 that stores the status of the processor at the time of instruction execution; a process identifier storage unit 1103 that stores a process number at the time of instruction execution; and a first pseudo data coherence management request address conversion unit 1180 (hereinafter also referred to simply as "address conversion unit 1180" and as "TLB 1105"). In addition to having the function of TLB for converting a logical address into a physical address, this address conversion unit 1180 is capable of judging whether such physical address (load/store address) is an address for which the pseudo data coherence management request signal should be activated. In order to be able to do this, the address conversion unit 1180 includes a logical access tag unit 1110 (TLB tag unit), a physical address data unit 1140, comparators 1161 to 1168, a distributor 1104, and selectors 1170 and 1171. Stored in the logical address tag unit 1110 are logical address tags 1111 to 1118, privilege levels 1121 to 1128, and process identifiers 1131 to 1138. Stored in the physical address unit 1140, are physical addresses 1141 to 1148 and first pseudo data coherence management request flags (hereinafter also referred to simply as "request flags") 1151 to 1158 indicating whether or not to activate the pseudo data coherence management request signal. When a load/store instruction is executed, the following are inputted to the TLB 1105: a logical address from the load/store access address unit 1101; a signal indicating the privilege level from the processor status storage unit 1102; and a process number from the process identifier storage unit 1103. When the address tag unit 1110 includes an entry that match the above inputs to the TLB 1105, it is a TLB hit, and the physical access address corresponding to such entry and a request flag are outputted as a load/store access address and a request signal 1173 to the respective local caches via the shared bus control unit 370 shown in FIG. 3. In the case of a TLB hit, the address conversion unit 1180 (TLB 1105) outputs the first pseudo data coherence management request signal 1173 indicating whether or not to enable the operation of the pseudo data coherence management unit as well as a signal to determine whether to store the data into the local cache of the processor 101.

As described above, each of the signals shown in FIG. 4, FIG. 5, FIG. 7, FIG. 10, and FIG. 11, to determine whether to store data into the local cache of the processor 101 corresponds to the pseudo data coherence management share judgment unit, and when each of such signals is active, data is not stored into the cache memory of the local cache of a processor that has executed a load/store instruction issued by a CPU, and data obtained from the shared bus control unit is transferred to the CPU.

Figure 14:
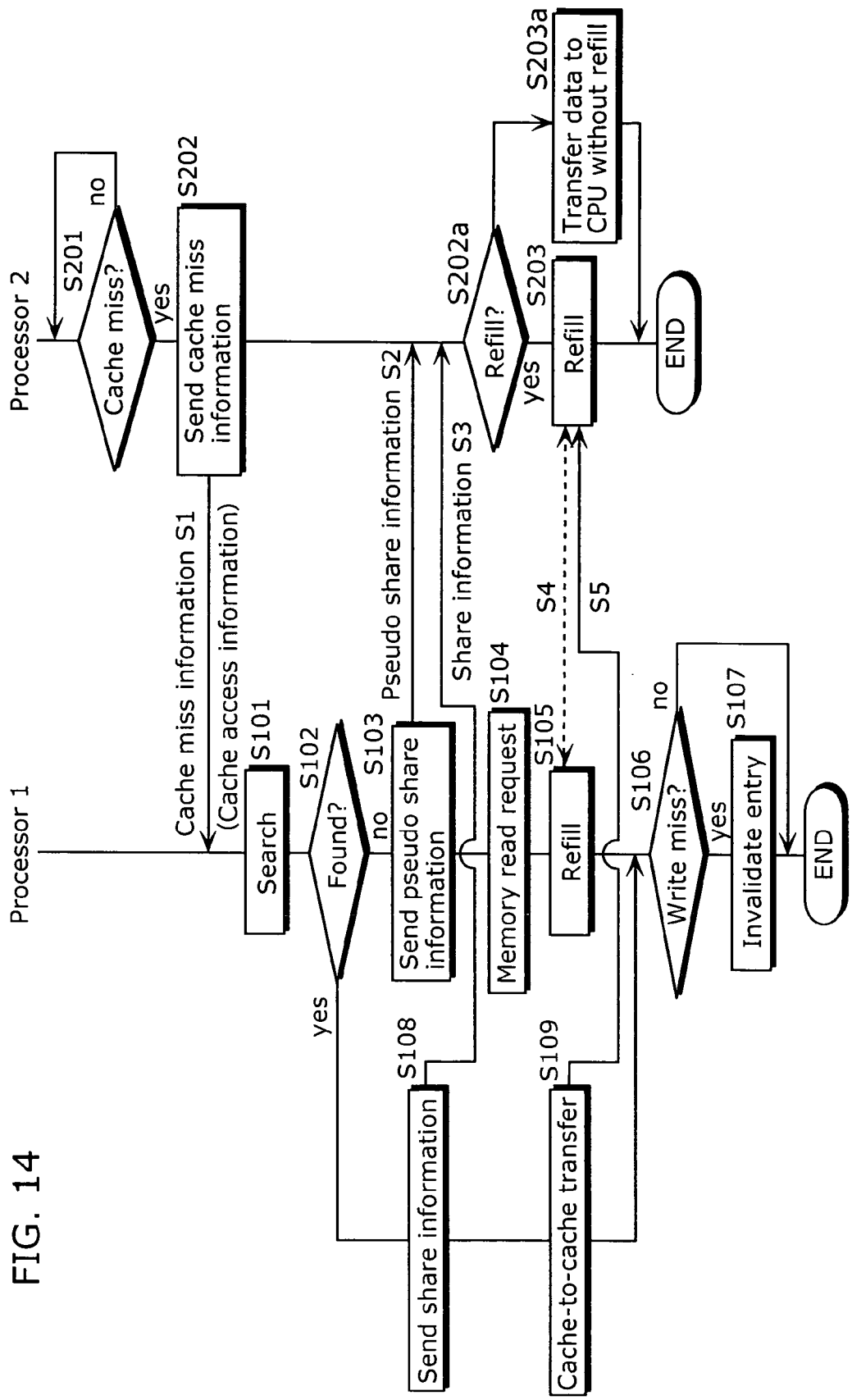
FIG. 14 is a flowchart showing operations performed by the respective local caches and the shared bus control unit when a cache miss has occurred.

FIG. 14 is a flowchart showing operations performed by the respective local caches and the shared bus control unit when a cache miss has occurred. The following description focuses on points different from the description of FIG. 13, with the same points as those shown in FIG. 13 being omitted. The different points are that details of the judgment made in Step S102 are slightly different and that Steps 5202a and 5203a are newly added.

In step S102 shown in FIG. 14, it is judged whether the first pseudo data coherence management request signal is active or not, in addition to the judgment of whether the search is successful or not. When the search is not successful and the first pseudo data coherence management request signal is active, pseudo share information is sent in S103.

In Step S202a, the processor 102 judges whether or not a signal to determine whether or not to store the data into the local cache of the processor 101 is active or not. When such signal is active, the processor 102 determines that the local cache of the processor 101 should be refilled with the data and proceeds to S203, whereas when such signal is not active, the processor 102 determines that the local cache of the processor 101 should not be refilled with the data and proceeds to S203a.

In Step S203a, the processor 102 directly transfers, to the CPU, cache miss data which is one of the data S4 read from the external memory and the data S5 transferred between the caches, without refilling the cache memory with one of the data S4 and the data S5.

The seventh embodiment has been described above as being capable of causing a pseudo data coherence management share judgment unit to perform the setting of whether to store refilled data into the cache memory of the local data cache connected to another CPU that has issued a load/store instruction, in order to selectively cause the pseudo data coherence management unit to perform a cache refill without causing unnecessary cache replacement in the own local cache, while improving the above-described methods for reducing wasteful use of cache capacity (shared use of unnecessary data). This is achieved by (i) selectively judging, when a data refill access is performed based on a judgment of the pseudo data coherence management unit, whether to store the data into the cache memory of the local data cache of a processor whose CPU has executed a load/store instruction, (ii) storing the data in the case where a data access has a great influence on the decrease in cache locality, and (iii) not storing the data in the case where the status of the local cache is not wished to be changed (not whishing to perform cache replacement) by means of protecting the present status of the cache memory or the like, rather than protecting reference locality.

Eighth Embodiment

Since real-time processing is highly required for some data accesses while it is not very important for the other data accesses, the seventh embodiment has described a method for causing a pseudo data coherence management unit to cause the other local cache to perform a refill operation for data which does not require real-time processing much and for causing such data to be stored only into the other local cache, in order to selectively protect the status of the own local cache in the case where data stored therein requires real-time processing. The seventh embodiment enables an effective use of cache capacity for both programs requiring real-time processing and not requiring real-time processing by solving the problem of the decrease in cache locality attributable to the pseudo data coherence management units as well as solving the problem of the reduction in cache capacity attributable to the addition of the function of the pseudo data coherence management units.

However, it happens for some programs that although a large amount of data has been processed through cache access, the results of such operations are simply stored without being used or recalculated (or the results of the operations are accessed again after a time interval that is beyond temporal locality). Such programs include a program for graphics processing or the like for which high-speed processing (at such a speed as can be perceived by a person as a CPU performance) is required even in the case of a data access for which real-time processing is not very important. In general, most of such data processing is arithmetic processes for which a large amount of data needs to be read in. In view of this, referring to FIG. 12, the eighth embodiment describes a multiprocessor that is capable of improving the decrease in reference locality caused by a cache access that would not originally have to be performed, by controlling the operations of the pseudo data coherence management units by use of first pseudo data coherence management request number storage units that limit the number of times refill operations are performed at background even at the time of graphics processing, for example, in which read accesses to a large amount of data are required, while improving the above-described methods for reducing wasteful use of cache capacity (shared use of unnecessary data).

Figure 12:
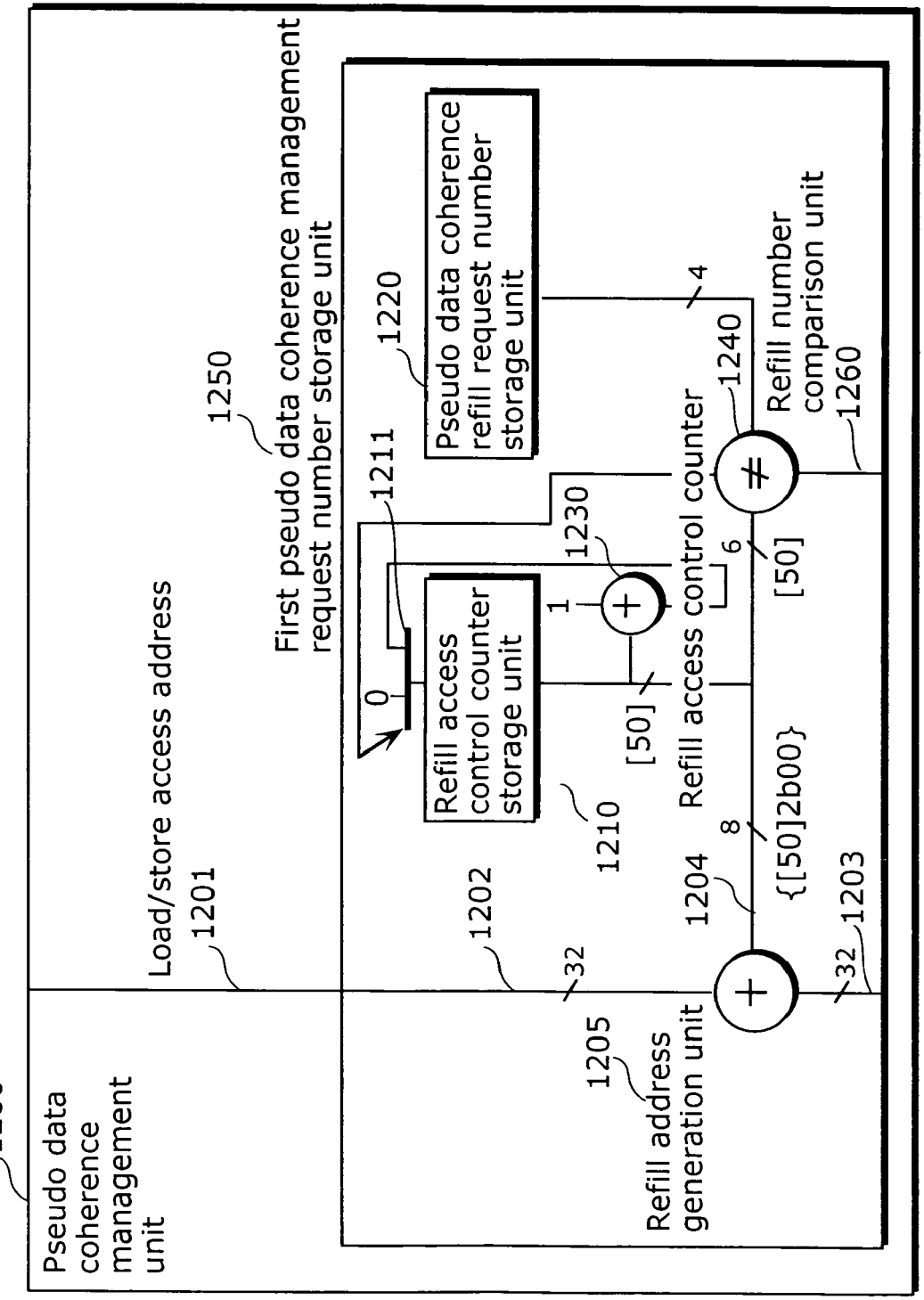
FIG. 12 is a diagram for describing functional blocks related to the pseudo data coherence management unit.

FIG. 12 depicts functional blocks related to each of the above-described first pseudo data coherence management request units. Each CPU includes a first pseudo data coherence management request number storage unit (hereinafter also referred to simply as "request number storage unit") 1250 that determines the number of refill operations that should be launched by the pseudo data coherence management unit. This request number storage unit 1250 has a refill access control counter storage unit 1210, a selector 1211, a pseudo data coherence refill request number storage unit (hereinafter also referred to simply as "refill request number storage unit") 1220, an adder 1230, a comparison unit 1240, and a refill address generation unit 1205. Of these, the refill access control counter storage unit 1210, selector 1211, and adder 1230 make up a refill access control counter. This refill access control counter increments the counter value by 1 for each load access made. The refill access control counter storage unit 1210 stores the count value. The adder 1230 adds 1 to the count value from the refill access control counter storage unit 1210. The selector 1211 selects one of inputs, "0" and a result of the addition obtained by the adder 1230, depending on a result of the comparison made by the comparison unit 1240. The refill request number storage unit 1220 stores the number of times refill access requests should be issued. The request number storage unit 1250 further includes a refill address generation unit 1205 that generates a refill address by adding a load/store access address 1202 and a signal 1204 that is obtained by shifting an output of the refill access control counter storage unit 1210 two bits to the left. In the case where an output of the refill request number storage unit 1220 and an output of the refill access control counter storage unit 1211 do not match as a result of comparison, such result is outputted to the shared bus control unit as a refill request signal 1260. With the pseudo data coherence management unit having the first pseudo data coherence management request number storage unit 1250 as described above, it is possible to improve reference locality since refill access requests are issued by the number of times set in the pseudo data coherence refill request number storage unit 1220 for a cache access requiring a large amount of data and thus a cache refill has already been completed when a CPU performs a data access.

Note that the eighth embodiment has described the case where the number of refill operations is set by the first pseudo data coherence refill request number storage unit, but the present invention is not limited to this structure. It is therefore possible to use the following as described in the second to sixth embodiments: a pseudo data coherence management request instruction detection unit that detects a specific instruction code; a pseudo data coherence management request mode detection unit that detects the above number of refill operations indicated in a processor status outputted from the processor status storage unit; a pseudo data coherence management request space judgment unit that determines the above number of refill operations according an address space to be accessed; a first pseudo data coherence management request address comparison unit that compares an address to be accessed with an address set in advance; and first a pseudo data coherence management request address conversion unit that stores the above number of refill accesses as TLB data.

Ninth Embodiment

The first to eighth embodiments have not described the case of enabling the operation of the pseudo data coherence management unit of an instruction local cache in response to an access to a data local cache. However, when a large amount of data needs to be cached as in the case of graphics processing described in the eighth embodiment, there is a possibility of decreased cache hit ratio since the status of the existing data cache changes. Thus, a higher cache efficiency is achieved if the data is stored into the instruction local cache by enabling the operation of the pseudo data coherence management unit of the instruction local cache in response to a notification from the cache access notification unit of the data local cache. This is because, since relatively the same instruction codes are repeatedly executed in instructions for processing a large amount of data, their instruction cache hit ratio is high and the amount of cache to be used is small. On the other hand, the cache hit ratio of data local caches is lower than that of instruction local caches in general, and thus when a large amount of cache replacement occurs, the hit ratio of data local caches is further decreased. It is therefore effective to utilize the pseudo data coherence management unit of an instruction local cache. However, unlike data local caches, instruction local caches do not manage any dirty bits. In view of this, the present embodiment describes a multiprocessor capable of maintaining data coherence even when a cache having no dirty bit is refilled with data by a data coherence management unit. Since such multiprocessor operates in the same architecture as that of the multiprocessor shown in FIG. 1, the ninth embodiment is described with reference to FIG. 1.

Referring to FIG. 1, it is assumed that data is stored in the cache memory 132, whereas the same data is not stored in the other cache memories 142, 152 and 162. Here, when the CPU 112 performs a write access to such data, the cache access notification unit 164 of the data local cache 161 outputs a signal to the shared bus control unit 170. In response to this, the cache accesses monitoring unit 135 of the instruction local cache 131 finds the above data as a result of searching the cache memory 132. In this case, the pseudo data coherence management unit 137 operates, and the pseudo data coherence management request unit operates in the case where the pseudo data coherence management request signal is active. Note that, since the above access is a write access and the cache memory 132 does not have any dirty bits, the pseudo data coherence management request unit writes such write data into the cache memory and issues a write access request to the external memory as the pseudo data coherence management unit. As described above, since data sharing between data local caches and instruction local caches becomes possible by managing an instruction local cache using the pseudo data coherence management unit, the ninth embodiment is capable of preventing the decrees in cache hit ratio, without changing the existing cache status, by making an effective use of reference locality of data access. The ninth embodiment is effective to be applied to a processing unit that has a pseudo data coherence management unit and a data share storage unit and that executes a program for which real-time processing is required, as well as being effective to be applied to an instruction local cache in the case where no allocation of data is performed after the completion of data processing.

Note that the ninth embodiment has described the case of updating the cache memory in response to a write access to an instruction local cache, but the present invention is not limited to this structure. It is therefore possible, for example, to invalidate the cache memory at a point in time when there is an access to the cache memory and then to perform a write access to the external memory.

Also note that the ninth embodiment has been described based on the multiprocessor architecture, but the present invention is not limited to this.

As described above, the multiprocessor according to the present invention, which is effective for use in a snoopy cache system in the multiprocessor system, allows for the reduction of unnecessary data sharing at the time of snoopy cache access utilizing reference locality of cache access, as well as allowing for effective cache-to-cache data transfer between instruction local caches and data local caches, without having to change the basic control structure. What is more, the multiprocessor according to the present invention is also capable of protecting the data stored in the own local cache for which real-time processing is required by not updating the own local cache in the case where plural programs requiring real-time processing reside in the cache memory, as well as being capable of increasing the efficiency of memory access by making an effective use of cache-to-cache data transfer.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A multiprocessing apparatus comprising a plurality of processors, a shared bus, and a shared bus controller,
    wherein each of said processors includes a central processing unit (CPU) and a local cache,
    each of said local caches includes a cache memory, and a cache control unit operable to control said cache memory,
    each of said cache control units includes a data coherence management unit operable to manage data coherence between said local caches by controlling data transfer carried out, via said shared bus, between said local caches,
    wherein a first cache control unit of said cache control units belonging to a first processor of said processors is operable to monitor a local cache access signal, outputted from a second processor of said processors, for notifying an occurrence of a cache miss, notify pseudo information to said second processor via said shared bus controller, the pseudo information indicating that data corresponding to the local cache access signal is stored in a first cache memory of a first local cache that includes said first cache control unit when the data corresponding to the local cache access signal is not actually stored in said first cache memory, and issue a memory read request to a main memory via said shared bus controller, the memory read request being issued to read, from the main memory, the data corresponding to the local cache access signal; and a second cache control unit of said cache control units belonging to said second processor is operable to store, in a second cache memory of said second processor, data corresponding to the local cache access signal, which is read out from said main memory via said shared bus in response to the memory read request by the first cache control unit.

2. The multiprocessing apparatus according to claim 1, wherein said first cache control unit and said second cache control unit are operable to store, into said first and second cache memories, respectively, the data that has been read out, via said shared bus, in response to the memory read request.

3. The multiprocessing apparatus according to claim 1, wherein said first cache control unit is operable to store the data, read out in response to the memory read request via said shared bus, into said first cache memory, and said second cache control unit is operable to output the data, read out in response to the memory read request via said shared bus, to a second CPU included in said second processor, without storing the data into said second cache memory when the second processor determines that the first cache memory should not be refilled with the data.

4. The multiprocessing apparatus according to claim 1, wherein a second cache control unit of said second processor includes:

a cache access notification unit operable to output, to said shared bus controller, the local cache access signal, which indicates details of a memory access performed by a second CPU on a second local cache belonging to the second processor, and said first cache control unit includes:

a cache access monitoring unit operable to monitor the local cache access signal, the local cache access signal notifying an occurrence of a cache miss in said second local cache, and search said first local cache for data corresponding to the local cache access signal;

a data coherence management unit operable to control data transfer between said first local cache and said shared bus controller in order to maintain data coherence between said second local cache and said first local cache, according to a result of the search performed by said cache access monitoring unit; and a pseudo data coherence management unit operable to judge whether or not said first local cache should perform a cache refill operation regardless of whether or not the data corresponding to the local cache access signal is stored in said first local cache, notify said second processor of the pseudo information in the case of judging that said first local cache should perform a cache refill operation, and control data transfer between said first local cache and said shared bus controller in order to maintain data coherence between said second local cache and said first local cache.

5. The multiprocessing apparatus according to claim 4, wherein said cache access notification unit is operable to output the local cache access signal to said shared bus controller, in the case where a memory access performed by said second CPU to said second local cache is one of a non-cacheable read access, a non-cacheable write access, a cacheable write access, and a cache miss of a cacheable read access.

6. The multiprocessing apparatus according to claim 4, wherein said cache access monitoring unit is operable to search said first cache memory for the data corresponding to the local cache access signal in response to one of a non-cacheable read access and a cache miss of a cacheable read access indicated by the local cache access signal, and said data coherence management unit is operable to control said first local cache so that said first local cache outputs the data corresponding to the local cache access signal in the case where the result of the search performed by said cache access monitoring unit is that data corresponding to the local cache access signal is stored in said first local cache.

7. The multiprocessing apparatus according to claim 4, wherein said cache access monitoring unit is operable to search said first cache memory for the data corresponding to the local cache access signal in response to a cache hit of a cacheable write access indicated by the local cache access signal, and said data coherence management unit is operable to control said first local cache so that said first local cache updates data stored in said first cache memory with data of the cacheable write access outputted to said shared bus controller, or so that said first local cache invalidates the data stored in said first cache memory, in the case where the result of the search performed by said cache access monitoring unit is that data different from the data corresponding to the local cache access signal is stored in said first cache memory.

8. The multiprocessing apparatus according to claim 4, wherein said cache access monitoring unit is operable to search said first cache memory for the data corresponding to the local cache access signal in response to a cache miss of a cacheable write access indicated by the local cache access signal, and said data coherence management unit is operable to control said first local cache so that said first local cache updates data stored in said first cache memory with data of the cacheable write access outputted to said shared bus controller and outputs the updated data to said shared bus controller, or so that said first local cache invalidates the data stored in said first cache memory, in the case where the result of the search performed by said cache access monitoring unit is that data different from the data corresponding to the local cache access signal is stored in said first cache memory.

9. The multiprocessing apparatus according to claim 4, wherein said cache access monitoring unit is operable to search said first cache memory for the data corresponding to the local cache access signal in response to a non-cacheable write access indicated by the local cache access signal, and said data coherence management unit is operable to control said first local cache so that said first local cache updates data stored in said first cache memory with data of the non-cacheable write access outputted to said shared bus controller, or so that said first local cache invalidates the data stored in said first cache memory of said first local cache, in the case where the result of the search performed by said cache access monitoring unit is that data different from the data corresponding to the local cache access signal is stored in said first cache memory.

10. The multiprocessing apparatus according to claim 4, wherein said second processor includes a first request unit operable to output, via said shared bus controller, a first request signal to said pseudo data coherence management unit, the first request signal requesting said first processor to manage data coherence using the pseudo information, and said pseudo data coherence management unit is operable to judge whether or not to notify the pseudo information based on the first request signal.

11. The multiprocessing apparatus according to claim 10, wherein said pseudo data coherence management unit is operable to judge whether or not said first local cache should perform a cache refill operation based further on the first request signal, in the case where the result of the search performed by said cache access monitoring unit is that data corresponding to the local cache access signal is not stored in said first cache memory.

12. The multiprocessing apparatus according to claim 10, wherein said second processor further includes a second request unit operable to output, via said shared bus controller, a second request signal to said pseudo data coherence management unit, the second request signal requesting said first processor to manage data coherence using the pseudo information, and said pseudo data coherence management unit is operable to judge whether or not to notify the pseudo information based on the first request signal and second request signal.

13. The multiprocessing apparatus according to claim 10, wherein said first request unit is operable to determine whether or not to activate the first request signal depending on decoding information from said second CPU, the decoding information indicating a result of decoding a load/store instruction executed by said second CPU.

14. The multiprocessing apparatus according to claim 13, wherein in the case of judging that said first local cache should perform a cache refill operation, said pseudo data coherence management unit causes said second local cache and said first local cache to store data into both of said respective cache memories, the data corresponding to the local cache access signal and having been read out by said first local cache by performing a cache refill operation.

15. The multiprocessing apparatus according to claim 13, wherein the first processor includes a pseudo data coherence management share judgment unit operable to output, to said pseudo data coherence management unit, a share judgment signal indicating whether or not to cause said pseudo data coherence management unit to store data into said second cache memory in the case where said pseudo data coherence management unit judges that said first local cache should perform a cache refill operation, the data corresponding to the local cache access signal and having been read out by said first local cache by performing a cache refill operation, and said pseudo data coherence management unit is operable to cause, in the case of judging that said first local cache should perform a cache refill operation, said first local cache to store the data into said first cache memory, and to cause said second local cache to store the data into said second cache memory.

16. A data coherence management method for use in a multiprocessing apparatus that includes a plurality of processors, a shared bus, and a shared bus controller, wherein each of the processors includes a central processing unit (CPU) and a local cache, each of the local caches includes a cache memory, and a cache control unit operable to control the cache memory, and each of the cache control units includes a data coherence management unit operable to manage data coherence between the local caches by controlling data transfer carried out, via the shared bus, between the local caches, said data coherence management method comprising:

monitoring a local cache access signal, outputted from a first processor, for notifying an occurrence of a cache miss, said monitoring being executed by a cache control unit of a second processor;

notifying pseudo information to the first processor via the shared bus controller, said notifying being executed by the cache control unit of the second processor, and the pseudo information indicating that data corresponding to the local cache access signal is stored in a cache memory of the second processor, when the data corresponding to the local cache access signal is not actually stored in the cache memory of the second processor;

issuing a memory read request by the cache control unit of the second processor to a main memory via said shared bus controller, the memory read request being issued to read, from the main memory, the data corresponding to the local cache access signal; and storing, in a cache memory of the first processor, data corresponding to the local cache access signal, which is read out from said main memory via said shared bus in response to the memory read request by the cache control unit of the second processor.

* * * * *